US008321465B2

(12) United States Patent
Farber et al.

(10) Patent No.: US 8,321,465 B2
(45) Date of Patent: Nov. 27, 2012

(54) SYSTEMS AND METHODS FOR DATA CODING, TRANSMISSION, STORAGE AND DECODING

(75) Inventors: Emanuel Farber, New York, NY (US); Scott Halstead, Hoboken, NJ (US); Michael J. Hardin, South Plainfield, NJ (US); Paul Crispin Williams, Horsham (GB)

(73) Assignee: Bloomberg Finance L.P., New York, NY (US)

( * ) Notice: Subject to any disclaimer, the term of this patent is extended or adjusted under 35 U.S.C. 154(b) by 1655 days.

(21) Appl. No.: 11/274,821

(22) Filed: Nov. 14, 2005

(65) Prior Publication Data

US 2006/0269148 A1 Nov. 30, 2006

Related U.S. Application Data

(60) Provisional application No. 60/627,856, filed on Nov. 14, 2004.

(51) Int. Cl.
*G06F 17/30* (2006.01)
(52) U.S. Cl. ........ 707/802; 707/791; 707/803; 707/804; 707/805; 707/935; 707/944; 707/950
(58) Field of Classification Search .................. 709/213; 705/1, 30, 38–40; 707/791, 802–805, 935, 707/944, 950
See application file for complete search history.

(56) References Cited

U.S. PATENT DOCUMENTS

| 4,525,779 A | 6/1985 | Davids et al. |
| 4,745,559 A | 5/1988 | Willis et al. |
| 4,750,135 A | 6/1988 | Boilen |
| 5,187,787 A | 2/1993 | Skeen et al. |
| 5,257,369 A | 10/1993 | Skeen et al. |
| 5,270,922 A | 12/1993 | Higgins |

(Continued)

FOREIGN PATENT DOCUMENTS

EP 0483037 A2 9/1991
(Continued)

OTHER PUBLICATIONS

J H Wilkinson, et al., Wrapper Files—The Key to Network Technology, International Broadcasting Convention, 1997, 374-379, Sony Broadcast & Professional Europe, UK.

(Continued)

*Primary Examiner* — Frantz Coby
(74) *Attorney, Agent, or Firm* — Frank J DeRosa; Jon Gordon; Frommer Lawrence & Haug LLP

(57) ABSTRACT

Systems and methods are provided for the provision of data for transmission and/or storage, the transmission and storage of data, and, more particularly, to data coding for transmission and/or storage and to decoding of received and/or accessed or retrieved coded data. In an embodiment of the invention, data is assembled into coded data structures comprising a plurality of fields that, e.g., may contain actual or implied field values, and data associated therewith that relates to the plurality of fields. Encoding and decoding of the data may take place with reference to one or more associated data models, and a coded data structure according to this embodiment may contain content only (field values and data identifying the structure). This allows for a reduction in size of the data structure as compared to, e.g., a data structure comprising program code or all data needed to describe the data in the data structure.

21 Claims, 33 Drawing Sheets

U.S. PATENT DOCUMENTS

| | | | |
|---|---|---|---|
| 5,321,750 A | 6/1994 | Nadan | |
| 5,327,559 A | 7/1994 | Priven et al. | |
| 5,339,392 A | 8/1994 | Risberg et al. | |
| 5,437,038 A | 7/1995 | Silberbauer et al. | |
| 5,557,798 A | 9/1996 | Skeen et al. | |
| 5,708,828 A | 1/1998 | Coleman | |
| 5,749,077 A | 5/1998 | Campbell | |
| 5,862,325 A | 1/1999 | Reed et al. | |
| 5,864,557 A | 1/1999 | Lyons | |
| 5,907,704 A | 5/1999 | Gudmundson et al. | |
| 5,913,038 A | 6/1999 | Griffiths | |
| 5,915,252 A | 6/1999 | Misheski et al. | |
| 5,987,432 A | 11/1999 | Zusman et al. | |
| 5,987,480 A | 11/1999 | Donohue et al. | |
| 5,999,934 A | 12/1999 | Cohen et al. | |
| 6,006,206 A | 12/1999 | Smith et al. | |
| 6,018,710 A | 1/2000 | Wynblatt et al. | |
| 6,026,392 A | 2/2000 | Kouchi et al. | |
| 6,029,181 A | 2/2000 | Milakovich et al. | |
| 6,044,205 A | 3/2000 | Reed et al. | |
| 6,076,094 A | 6/2000 | Cohen et al. | |
| 6,085,198 A | 7/2000 | Skinner et al. | |
| 6,088,717 A | 7/2000 | Reed et al. | |
| 6,092,118 A | 7/2000 | Tsang | |
| 6,125,388 A | 9/2000 | Reisman | |
| 6,151,608 A | 11/2000 | Abrams | |
| 6,157,956 A | 12/2000 | Jensen et al. | |
| 6,195,662 B1 | 2/2001 | Ellis et al. | |
| 6,216,131 B1 | 4/2001 | Liu et al. | |
| 6,253,244 B1 | 6/2001 | Moore et al. | |
| 6,253,264 B1 | 6/2001 | Sebastian | |
| 6,278,982 B1 | 8/2001 | Korhammer et al. | |
| 6,281,892 B1 | 8/2001 | Long et al. | |
| 6,289,345 B1 | 9/2001 | Yasue | |
| 6,345,278 B1 | 2/2002 | Hitchcock et al. | |
| 6,477,580 B1 | 11/2002 | Bowman-Amuah | |
| 6,553,393 B1 * | 4/2003 | Eilbott et al. | 715/207 |
| 6,587,840 B1 | 7/2003 | Smith et al. | |
| 6,611,817 B1 * | 8/2003 | Dorrance et al. | 705/39 |
| 6,657,568 B1 * | 12/2003 | Coelho et al. | 341/60 |
| 7,165,114 B1 * | 1/2007 | Russell et al. | 709/231 |
| 7,328,005 B2 * | 2/2008 | Aasman et al. | 455/414.4 |
| 7,505,395 B2 * | 3/2009 | Ashdown et al. | 370/205 |
| 7,831,511 B1 * | 11/2010 | Akin et al. | 705/40 |
| 7,885,868 B2 * | 2/2011 | Nault | 705/30 |
| 8,070,055 B2 * | 12/2011 | Block et al. | 235/380 |
| 2002/0016839 A1 | 2/2002 | Smith et al. | |
| 2002/0019812 A1 | 2/2002 | Board et al. | |
| 2002/0138407 A1 * | 9/2002 | Lawrence et al. | 705/38 |
| 2003/0093372 A1 * | 5/2003 | Atogi et al. | 705/40 |
| 2003/0097327 A1 | 5/2003 | Anaya et al. | |
| 2003/0126056 A1 | 7/2003 | Hausman et al. | |
| 2003/0149586 A1 * | 8/2003 | Chen et al. | 705/1 |
| 2003/0229716 A1 | 12/2003 | Holland | |
| 2004/0003075 A1 | 1/2004 | Zamanzadeh et al. | |
| 2004/0042506 A1 | 3/2004 | Fallon et al. | |
| 2004/0111375 A1 * | 6/2004 | Johnson | 705/64 |
| 2005/0119955 A1 * | 6/2005 | Dang et al. | 705/31 |
| 2005/0216378 A1 * | 9/2005 | Bickel et al. | 705/30 |
| 2006/0100954 A1 | 5/2006 | Schoen | |
| 2009/0132446 A1 * | 5/2009 | Milenova et al. | 706/12 |
| 2009/0307243 A1 * | 12/2009 | Heuer et al. | 707/100 |
| 2012/0074217 A1 * | 3/2012 | Block et al. | 235/379 |
| 2012/0095906 A1 * | 4/2012 | Dorsey et al. | 705/39 |

FOREIGN PATENT DOCUMENTS

| | | |
|---|---|---|
| WO | WO 97/15003 | 4/1997 |
| WO | WO 97/15018 | 4/1997 |
| WO | WO 97/22072 | 6/1997 |
| WO | WO 01/16734 A2 | 3/2001 |

OTHER PUBLICATIONS

James E. Hartley, FISD's XML Messaging Specification "fisdMessage", Dec. 16, 2003, Version 1.0-beta.

* cited by examiner

MarketDepth.ByLevel.Ask.Price

Description
Market depth Ask by price level.

Required Fields

| Name | Type | Description |
| --- | --- | --- |
| MarketDepth.TableCommand | TableCommand | Indicates the action that should be taken in response to a market depth event. |
| MarketDepth.ByLevel.Time | time | Time of the market depth by level message. |
| MD.Security.ID.BLP | string | This is the unique real-time identifier. |
| MD.Source | string | Identifier for the source of the information. |
| MD.Entitlement | uint32 | The Entitlement Code for the market data message. |
| MD.Bloomberg.Sequence | uint64 | Required sequence number for the message. This number will not be monotonically increasing. It will be unique for this message. |
| MarketDepth.ByLevel.Ask.Price | float32 | Ask price at this level. |

Optional Fields

| Name | Type | Description |
| --- | --- | --- |
| MarketDepth.ByLevel.Sequence | uint32 | Sequence number for the market by level book. |
| MD.Source.Sequence | uint32 | Optional source defined sequence number for the message. |
| MD.Feed.Provider | string | The code for the data provider versus the source. |
| MarketDepth.ByLevel.Ask.ConditionCode.BLP | string | This field contains the condition code mnemonic(s). |
| MarketDepth.ByLevel.Ask.ConditionCode.Source | string | This field contains the Provider assigned condition code mnemonic(s). |
| MarketDepth.ByLevel.Ask.NumberofOrders | uint32 | The total number of orders at this ask. |
| MarketDepth.ByLevel.Ask.Position | uint16 | Position of the ask in the market depth by level book. |
| MarketDepth.ByLevel.Ask.Size | uint32 | Volume of securities at this ask. |
| MarketDepth.ByLevel.Ask.Value.NotAvailable | bool | TRUE in this field indicates that zero, negative, and NAN values represent unavailable pricing. |

FIG. 5

Quote.Ask.Price

Description

Ask price quote.

Required Fields

| Name | Type | Description |
| --- | --- | --- |
| MD.Security.ID.BLP | string | This is the unique real-time identifier. |
| MD.Source | string | Identifier for the source of the information. |
| MD.Entitlement | uint32 | The Entitlement Code for the market data message. |
| MD.BLP Sequence | uint64 | Required sequence number for the message. This number will not be monotonically increasing. It will be unique for the message. |
| Quote.Ask.Time | time | Time of the ask quote. |
| Quote.Ask.QuoteType | string | Indicator of quote status relative to the best. |
| Quote.Ask.UpdateActions | uint32 | When the least significant bit of this bit map is on, the quote information should be copied into Summary.<pricingmethod>.Last.Ask.*cache fields. |
| Quote.Ask.Price | float32 | Ask price. |

Optional Fields

| Name | Type | Description |
| --- | --- | --- |
| MD.Source.Sequence | uint32 | Optional source defined sequence number for the message. |
| MD.Feed.Provider | string | The code for the data provider versus the source. |
| Quote.Ask.Broker.BLP | string | Mnemonic for the broker. |
| Quote.Ask.Broker.Source | string | Source provided mnemonic for the broker. |
| Quote.Ask.ConditionCode.BLP | string | This field contains the mnemonic(s) for special conditions on the quote. |
| Quote.Ask.ConditionCodeSource | string | This field contains the Provider assigned mnemonic(s) for special conditions on the ask quote. |
| Quote.Ask.LocalSource | string | Provides the local market center where the ask quote originated. |
| Quote.Ask.Size | uint32 | Size of the ask quote. |
| Quote.Ask.Size.IsBLPCalculation | bool | TRUE in this field indicates that the ask size is a calculated value. |
| Quote.Ask.Session | string | Bloomberg mnemonic indicating what session the quote occurred in. |
| Quote.Ask.Value.Is.BLPCalculation | bool | TRUE in this field indicates the ask value is a calculation and not an exchange or source created value. |
| Quote.Ask.Value.NotAvailable | bool | TRUE in this field indicates that zero, negative, and NAN values represent unavailable pricing. |

FIG. 6

MarketDepth.ByLevel.Ask.Spread

Description

Market depth Ask by spread level.

Required Fields

| Name | Type | Description |
| --- | --- | --- |
| MarketDepth.TableCommand | TableCommand | Indicates the action that should be taken in response to a market depth event. |
| MarketDepth.ByLevel.Time | time | Time of the market depth by level message. |
| MD.Security.ID.BLP | string | This is the unique real-time identifier. |
| MD.Source | string | Identifier for the source of the information. |
| MD.Entitlement | uint32 | The Entitlement Code for the market data message. |
| MD.BLP.Sequence | uint64 | Required sequence number for the message. This number will not be monotonically increasing. It will be unique for this message. |
| MarketDepth.ByLevel.Ask.Price | float32 | Ask price at this level. |

Optional Fields

| Name | Type | Description |
| --- | --- | --- |
| MarketDepth.ByLevel.Sequence | uint32 | Sequence number for the market by level book. |
| MD.Source.Sequence | uint32 | Optional source defined sequence number for the message. |
| MD.Feed.Provider | string | The code for the data provider versus the source. |
| MarketDepth.ByLevel.Ask.ConditionCode.BLP | string | This field contains the condition code mnemonic(s). |
| MarketDepth.ByLevel.Ask.ConditionCode.Source | string | This field contains the Provider assigned condition code mnemonic(s). |
| MarketDepth.ByLevel.Ask.NumberofOrders | uint32 | The total number of orders at this ask. |
| MarketDepth.ByLevel.Ask.Position | uint16 | Position of the ask in the market depth by level book. |
| MarketDepth.ByLevel.Ask.Size | uint32 | Volume of securities at this ask. |
| MarketDepth.ByLevel.Ask.Value.NotAvailable | bool | TRUE in this field indicates that zero, negative, and NAN values represent unavailable pricing. |

FIG. 7

Quote.Ask.Spread

Description
Ask price quote.

Required Fields

| Name | Type | Description |
|---|---|---|
| MD.Security.ID.BLP | string | This is the unique real-time identifier. |
| MD.Source | string | Identifier for the source of the information. |
| MD.Entitlement | uint32 | The Entitlement Code for the market data message. |
| MD.Sequence | uint64 | Required sequence number for the message. This number will not be monotonically increasing. It will be unique for the message. |
| Quote.Ask.Time | time | Time of the ask quote. |
| Quote.Ask.QuoteType | string | Indicator of quote status relative to the best. |
| Quote.Ask.UpdateActions | uint32 | When the least significant bit of this bit map is on, the quote information should be copied into Summary.<pricingmethod>.Last.Ask.*cache fields. |
| Quote.Ask.Spread | float32 | Ask spread. |

Optional Fields

| Name | Type | Description |
|---|---|---|
| MD.Source.Sequence | uint32 | Optional source defined sequence number for the message. |
| MD.Feed.Provider | string | The code for the data provider versus the source. |
| Quote.Ask.Broker.BLP | string | Mnemonic for the broker. |
| Quote.Ask.Broker.BLP | string | Mnemonic for the broker. |
| Quote.Ask.ConditionCode.BLP | string | Source provided mnemonic for the broker. |
| Quote.Ask.ConditionCode.BLP | string | This field contains the mnemonic(s) for special conditions on the quote. |
| Quote.Ask.ConditionCode.Source | string | This field contains the Provider assigned mnemonic(s) for special conditions on the ask quote. |
| Quote.Ask.LocalSource | string | Provides the local market center where the ask quote originated. |
| Quote.Ask.Size | uint32l | Size of the ask quote. |
| Quote.Ask.Size.IsBLPCalculation | bool | TRUE in this field indicates that the ask size is a calculated value. |
| Quote.Ask.Session | string | Mnemonic indicating what session the quote occurred in. |
| Quote.Ask.Value.IsBLPCalculation | bool | TRUE in this field indicates the ask value is a calculation and not an exchange or source created value. |
| Quote.Ask.Value.NotAvailable | bool | TRUE in this field indicates that zero, negative, and NAN values represent unavailable pricing. |

FIG. 8

Status.Security

Description
The status event provides security status information, such as halts, resumes, and new issues.

Required Fields

| Name | Type | Description |
| --- | --- | --- |
| MD.Security.ID.BLP | string | This is the unique real-time identifier. |
| MD.Source | string | Identifier for the source of the information. |
| MD.Entitlement | uint32 | The Entitlement Code for the market data message. |
| MD.BLPSequence | uint64 | Required sequence number for the message. This number will not be monotonically increasing. It will be unique for this message. |
| Status.Security.MarketCategory | string | Type of suspension. Values in this field can indicate unexpected suspensions, such as news or auction suspension. |
| Status.Security.Allow.Quotes | bool | True/False indicator showing whether quoting is allowed for a security. |
| Status.Security.Allow.Trades | bool | True/False indicator showing whether trading is allowed for a security. |
| Status.Time | time | Time of the status message. |
| Status.Security.Simplified | string | Simplified status mnemonic for the current market status of a security. |

Optional Fields

| Name | Type | Description |
| --- | --- | --- |
| MD.Source.Sequence | uint32 | Optional source defined sequence number for the message. |
| MD.Feed.Provider | string | The code for the data provider versus the source. |
| Status.Security.Period.BLP | string | Mnemonic for the current trading period of a security. |
| Status.Security.BLP | string | Mnemonic for the current trading status of a security. |
| Status.Security.LocalSource | string | Local market center for the status update. |

FIG. 9

Page.Update

Description
This event disseminates updates to rows of page-based data. Pages are numbered and are of a fixed length of 25 rows.

Required Fields

| Name | Type | Description |
| --- | --- | --- |
| MD.Source | string | Identifier for the source of the information. |
| MD.Entitlement | uint32 | The Entitlement Code for the market data message. |
| Page.Category | uint32 | Category of page data from the contributor. |
| Page.Number | uint32 | Page number used for locating information across multiple pages. |
| Page.Column | uint16 | The starting column number of text. |
| Page.Row | uint16 | Row number of the row to be updated. |
| Page.Text | string | The text to display in the updated row. This field may include attributes preceded by a { as indicated in page reference data. |
| Page.Time | time | Time of the page update. |

Optional Fields

| Name | Type | Description |
| --- | --- | --- |
| Page.ClearRow | bool | TRUE in this field indicates that existing content in the row should be cleared prior to applying the row text update. |

FIG. 10

Summary

Description
The summary event contains all intraday statistics for an Security.

Required Fields

| Name | Type | Description |
| --- | --- | --- |
| MD.Security.ID.BLP | string | This is the unique real-time identifier. |
| MD.Source | string | Identifier for the source of the information. |
| MD.Entitlement | uint32 | The entitlement code for the market data message. |
| MD.BLP.Sequence | uint64 | Required sequence number for the message. This number will not be monotonically increasing. It will be unique for this message. |
| Summary.UpdateType | SummaryUpdateType | Indicates the type of summary update, e.g., Open, Intraday, Refresh. |
| Summary.Time | time | Time of the summary message. |

Optional Fields

| Name | Type | Description |
| --- | --- | --- |
| MD.Source.Sequence | uint32 | Optional source defined sequence number for this message. |
| MD.Feed.Provider | string | The code for the data provider versus the source. |
| Summary.ValueTraded | float64 | Value traded for the day or session. |
| Summary.CumulativeVolume | uint32 | Total number of shares traded intraday. |
| Summary.TotalTrades | uint32 | The total number of trades on a given day. |
| Summary.VWAP.BLP | float64 | VWAP for a security. |

FIG. 11-1

Optional Fields for Summary (continued)

| Name | Type | Description |
|---|---|---|
| Summary.VWAP.BLP.CumulativeVolume | uint32 | Total Volume for trades included in the VWAP calculation. |
| Summary.VWAP.BLP.ValueTraded | float64 | Total Value Traded for trades included in the VWAP calculation. |
| Summary.VWAP.Source | float64 | Exchange or data provider calculated VWAP for an Security. |
| Summary.OrderBookVolume | uint32 | Cumulative volume of all orders in the order book for a security. |
| Summary.NonOrderBookVolume | uint32 | The volume of trades executed off board or off exchange. |
| Summary.Openinterest | uint32 | Total number of outstanding agreements for a contract. |
| Summary.Last.Ask.Broker.BLP | string | Mnemonic for the broker providing the last ask quote. |
| Summary.Last.Ask.Broker.Source | string | Source mnemonic for the broker providing the last ask quote. |
| Summary.Last.Ask.ConditionCode.BLP | string | This field contains the mnemonic(s) for special conditions on the last ask quote. |
| Summary.Last.Ask.ConditionCode.Source | string | This field contains the Source mnemonic(s) for special conditions on the last ask quote. |
| Summary.Last.Ask.LocalSource | string | Provides the local market center where the last ask quote originated. |
| Summary.Last.Ask.Size | Uint32 | Size of the last ask quote. |
| Summary.Last.Ask.Size.Is.BLPCalculation | bool | TRUE in this field indicates that the size of the last ask quote is a calculated value. |
| Summary.Last.Ask.Time | time | The time of the last ask quote. |
| Summary.Last.Bid.Broker.BLP | string | Mnemonic for the broker providing the last bid quote. |
| Summary.Last.Bid.Broker.Source | string | Source mnemonic for the broker providing the last bid quote. |
| Summary.Last.Bid.ConditionCode | string | This field contains the mnemonic(s) for special conditions on the last bid quote. |
| Summary.Last.Bid.ConditionCode.Source | string | This field contains the Source mnemonic(s) for special conditions on the last bid quote. |
| Summary.Last.Bid.LocalSource | string | Provides the local market center where the last bid quote originated. |
| Summary.Last.Bid.Size | uint32 | Size of the last bid quote. |
| Summary.Last.Bid.Size.IsBLPCalculation | bool | TRUE in this field indicates that the size of the last bid quote is a calculated value. |

•
•
•
•
etc.

FIG. 11-2

Reference.Security.Equity

Description
Descriptive information about equity security.

Required Fields

| Name | Type | Description |
| --- | --- | --- |
| MD.Security.ID.BLP | string | This is the unique real-time identifier. |
| MD.Source | string | Identifier for the source of the information. |
| MD.Entitlement | uint32 | The Entitlement Code for the market data message. |
| Reference.Security.BLP.UniqueID | string | A unique number assigned to all securities. |
| Reference.Company.ID.BLP | string | A number that is assigned to all companies that issue securities. |
| Reference.Security.ID.Ticker.BLP | string | For equity securities the field will return the ticker which may or may not be an exchange symbol, such as IBM for IBM US Equity. For corp., pfd., muni., m-mkt., govt & mtge securities the ticker is created to store and link related securities. |
| Reference.Security.ID.Name | string | The name of a company or contract. |
| Reference.Security.Currency | string | Currency in which the security or a contract is traded. For Fixed Income securities this field returns the currency in which the Bond is issued in not necessarily the currency that the Bond is paid in. For futures contracts, this field returns the currency in which the contract value is quoted, not necessarily the currency in which the price is quoted. |

FIG. 12-1

Optional Fields

| Name | Type | Description |
| --- | --- | --- |
| Reference.Security.Description | string | For Corporate, Government and Preferred bonds this field will return the ticker, coupon, and maturity. For Mortgage bonds the field will return the ticker, series, and class. For Municipal bonds this field will return the cusip. For equities, equity indices, funds, and futures the field will return the ticker. For non-equity indices this field will return the name. For equity options the field returns the ticker, exchange code, expiration month, call type, and strike price. For Options on futures the field returns the ticker and strike price. For currencies the field will return the ticker followed by the word Curncy. |
| Reference.Security.PrimaryPricingMethod | string | The Primary Pricing Method is the market convention for pricing an instrument. |
| Reference.Company.Name | string | The official long name of the company. For equity options, this field is populated by the underlying security's long company name. |
| Reference.Security.LotSize.Quote | uint32 | The number of shares represented by the quote or bid/ask price. |
| Reference.Security.LotSize.Trade | uint32 | The minimum number of shares that can be purchased, as regulated by an exchange. |
| Reference.Security.Type | string | A description of the type of security. |
| Reference.Security.ID.BLP | string | A number that is assigned to a specific security. |
| Reference.Time | time | Data and time of the most recent reference data update. |
| Reference.Security.IP.BLP.ParsekeyableDescription | string | This identifier is the string that can be entered into the system to uniquely select this security. This description includes the source of the security. |
| Reference.Price.DisplayFormat.FractionDenominator | uint16 | Denominator for fractional display if fractions are the market custom. |

- 
- 
- 
- etc.

FIG. 12-2

A.3.83 Quote.Ask.Yield
Type
float32
Description
Ask yield.
Required in
Quote.Ask.Yield

A.3.84 Quote.Bid.Broker.BLP
Type
string
Description
Mnemonic for the broker.
Optional in
Quote.Bid.Discount        Quote.Bid.Spread
Quote.Bid.Price           Quote.Bid.Yield

A.3.85 Quote.Bid.Broker.Source
Type
string
Description
Source provided mnemonic for the broker.
Optional in
Quote.Bid.Discount        Quote.Bid.Spread
Quote.Bid.Price           Quote.Bid.Yield

A.3.86 Quote.Bid.ConditionCode.BLP
Type
string
Description
This field contains the mnemonic(s) for special conditions on the quote.
Optional in
Quote.Bid.Discount        Quote.Bid.Spread
Quote.Bid.Price           Quote.Bid.Yield

FIG. 13

A.3.213 Status.Source.Sequence.Reset.New
Type
uint32
Description
New sequence number – usually zero, or last valid + 1.
Optional in
Status.Source.Sequence.Reset

A.3.214 Status.Source.Session
Type
string
Description
Code for the trading session.
Required in
Status.Source.Session.Begin
Status.Source.Session.End

A.3.215 Status.Time
Type
time
Description
Time of the status message.
Required in

| | | |
|---|---|---|
| Status.Security | Status.Source.Emergency.Resume | Status.Source.Session.End |
| Status.Source.Day.Begin | Status.Source.Information | |
| Status.Source.Day.Halt | Status.Source.Sequence.Reset | |
| Status.Source.Emergency.Halt | Status.Source.Session.Begin | |

A.3.216 Summary.CumulativeVolume
Type
uint32
Description
Total number of shares traded intraday.
Optional in

| | | |
|---|---|---|
| Summary | Trade.Price | Trade.Yield |
| Trade.Discount | Trade.Spread | |

FIG. 14

BrokerMode

Description
This is the broker quoting mode. The mode is either an open quote, meaning this is an active quote that can be traded against, or a closed quote, in which case the broker has withdrawn their quote from the market and no longer is available to trade with.

Constants

| Name | Description |
|---|---|
| OPEN | The broker quote is open. The quote can be traded against and is considered to be and active quote from a participating broker. |
| CLOSED | The broker quote is closed. The broker has withdrawn its quote from the market and is considered to be closed out. |

Fields
MarketDepth.ByOrder.Ask.Broker.Mode    MarketDepth.ByOrder.Bid.Broker.Mode

PriceDisplayFormat

Description
The price display form enumeration indicates the market convention for display of prices on the user screen.

Constants

| Name | Description |
|---|---|
| UNASSIGNED | The default constant "UNASSIGNED" is used to initialize all enumeration type fields. |
| DECIMAL | The display format for price is a decimal. |
| FRACTION | The display format for price is a fraction. |

Fields
Reference.Price.DisplayFormat.Type

SummaryUpdateType

Description
The Summary Update Type enumeration contains the list of valid values for the types of Summary update events that may occur.

Constants

| Name | Description |
|---|---|
| INTRADAY | The summary message is an intraday update generated by a ticker plant recap message for one or more fields. The intraday message implies that only the fields present in the message should be overwritten. No values in the cache should be zeroed out as a result of an intraday summary update. |
| CLOSE | The summary represent the closing values for a given source. Excluding post session trading activity, this closing summary will represent the end of day or session values for a source. This can be disseminated multiple times if a source allows corrections to be disseminated after market close. |
| PREOPEN | The summary message is a pre-open update. This summary is disseminated prior to the opening of the security and source for trading. |
| REFRESH | This update type is sent when a full refresh of the intraday statistics is sent down from the cache component. A REFRESH type implies that any field not included in the message should be zeroed out in the cache. |
| UNASSIGNED | The default constant "UNASSIGNED" is used to initialize all enumeration type fields. |

Fields
Summary.UpdateType

FIG. 15-1

TableCommand
Description
The Table Command enumeration contains the list of values for actions that can be taken in response to a market depth quote event.
Constants

| Name | Description |
| --- | --- |
| UNASSIGNED | The default constant "UNASSIGNED" is used to initialize all enumeration type fields. |
| ADD | Add event details to the market depth cache. |
| DEL | Delete this event from the market depth cache. |
| DELALL | Delete all events from the cache. This is a market depth flush usually passed at the start or end of trading or when a trading halt occurs. |
| DELBETTER | Depth by order only – delete this order and all superior orders. The order id at this position – 1 is not the best order. This differs from the EXEC command in that it deletes the current order, where the EXEC command modifies the current order. |
| DELSIDE | Delete all events on the corresponding side (bid/ask) of the depth cache. |
| DELSOURCE | Flush the cache for all securities in this market. |
| EXEC | Trade Execution – depth by order only. find the corresponding order in the cache, replace event details with this event and delete orders with greater priority. |
| MOD | Modify an existing event in the market depth cache. |
| MODBETTER | Depth by order only – Find this event in the cache and replace with information from this event. Modify the price of any order at a greater ranking. Orders with zero price should be excluded from the MODBETTER command. |
| REPLACE | Replace previous price level or order at this position or with this order id. Add order or price level if you do not have it currently in the cache. |
| REPLACE_BY_BROKER | This table command is used for top of file feeds where the action is to replace by the broker mnemonic. The recipient needs to find the broker in their cache and replace the quote with the one in the market depth event. If that broker is not present, it should be added to the cache. |

Fields
MarketDepth.TableCommand

FIG. 15-2

| Section | Element | Occurrences | Type | Description |
|---|---|---|---|---|
| Header | Binary File Format | 1 | UINT32 | Version number of the binary file format |
| | Minimum backwardly compatible format | 1 | UINT32 | Minimum binary file version number with which the binary file format is compatible. For versions 2 and 3, this is 2; for versions 4 and 5, this is 4. (Adding optional sections to the end of a binary file is a compatible format change—data unread by the BDD run-time engine should be ignored.) |
| | Comment | 1 | STRING | Comment describing the file; ignored by the run-time engine and not transmitted to clients. |
| | Data model version (version 4 and later) | 1 | UINT32 | Version of the data model; used to establish which object has precedence when multiple conflicting versions of an object are present. |
| Enumerations | Enumeration count | 1 | UINT32 | Number of enumeration types defined in this binary file. |
| | Enumeration name | Enumeration count | STRING | Globally unique name of the enumeration type. |
| | Enumeration status | | UINT32 | Status of the enumeration type (see object status table). |
| | Enumeration description | | STRING | Text description of the enumeration type. |
| | Enumeration constant count | | UINT32 | Number of enumeration constants defined (or redefined) for this enumeration. May be 0 is enumeration status or description is redefined. |
| | Constant name | Enumeration constant count | STRING | Name of the enumeration constant, unique for the enumeration type. |
| | Constant id | | UINT32 | Numeric value of the enumeration constant, unique for the enumeration type. This is 0 for the enumeration's default constant. |
| | Constant status | | UINT32 | Status of the enumeration type (see object status table). |
| | Constant description | | STRING | Text description of the enumeration constant. |
| Fields | Field count | 1 | UINT32 | Number of fields defined in this binary file. |
| | Field name | Field count | STRING | Globally unique name of the field. |
| | Field status | | UINT32 | Status of the field (see object status table). |
| | Field description | | STRING | Text Description of the field. |
| | Field type | | UINT32 | Field type (see field type table). |
| | Field enumeration type, if field type is ENUMERATION | | STRING | Name of the field's enumeration type, must have been previously defined (in this or another binary file). |
| | Bit mask count, if field type is not ENUMERATION | | UINT32 | Number of bit mask flags defined for the field. this should be zero except for unsigned integer types. |
| | Flag name, if field type is not ENUMERATION | Bit mask count | STRING | Name of the bit mask flag, unique for this field. |

FIG. 17-1

| Section | Element | Occurrences | Type | Description |
|---|---|---|---|---|
| Event types | Event type count | 1 | UINT32 | Number of event types defined in this binary file. |
| | Event type name | Event type count | STRING | Globally unique name of the event type. |
| | Event type id | | UINT32 | Numeric identifier used to identify the event type, globally unique. |
| | Event type status | | UINT32 | Status of the event type (see object status table). |
| | Event type description | | STRING | Text description of the event type. |
| | Event CRC16 (version 7 and later) | | UINT32 | Bottom 16 bits contain a CRC16 on the event definition, i.e., the null-terminated event name plus the bytes comprising the rest of the version 7 event definition, below. |
| | Required field count | | UINT32 | Number of fields required in the event type. |
| | Required fields | Required field count | STRING | Name of a field required in the event type; order is preserved. |
| | Field type (version 7 and later) | | UINT32 | Field type (see field type table). |
| | Field enumeration type, if field type is ENUMERATION (version 7 and later) | | STRING | Name of the field's enumeration type, must have been previously defined (in this or another binary file). |
| | Optional field count | | UINT32 | Number of fields optional in the event type. |
| | Optional fields | Optional field count | STRING | Name of a field optional in the event type; order is preserved. |
| | Field type (version 7 and later) | | UINT32 | Field type (see field type table). |
| | Field enumeration type, if field type is ENUMERATION (version 7 and later) | | STRING | Name of the field's enumeration type, must have been previously defined (in this or another binary file). |
| Event type hierarchy (version 3 and later) | Hierarchy event type count | 1 | UINT32 | Number of event types for which an inheritance hierarchy is specified in the binary file. |
| | Event type name | Hierarchy event type count | STRING | Name of an event type for which an ISA relationship is being specified. |
| | ISA count | | UINT32 | Number of other event types that this event type implies. |
| | Event type name | ISA count | STRING | Names of other event types that are "parents" of this event type, e.g. |

FIG. 17-2

| DataDictionaryImpl |
|---|
| -comment_ : String<br>-enumerations : Map_String_2_EnumerationImpl<br>-enumerationVector : Vector_EnumerationImpl<br>-error_ : String<br>-events : Map_String_2_EventTypeImpl<br>-eventTypeVector : Vector_EventTypeImpl<br>-fieldIdMap : Map_FieldId_2_FieldImpl<br>-fields : Map_String_2_FieldImpl<br>-fieldVector : Vector_FieldImpl<br>-nominalDataModelVersion : unsigned<br>-zombieEventTypes : HashMap_unsigned_2_List_EventTypeImpl |
| +getEventType()<br>+setEventType()<br>+setZombieEventType()<br>+comment()<br>+dump()<br>+enumeration()<br>+enumeration()<br>+error()<br>+eventType()<br>+eventTypes()<br>+field()<br>+newMessage()<br>+nextEnumeration()<br>+nextEventType()<br>+nextField()<br>+read()<br>+read()<br>+readEventType()<br>+shutdown()<br>+version()<br>+write()<br>+write()<br>+writeEventType() |

| SDMessageImpl.Fields |
|---|
| -present : boolean
-values : FieldValue |

FIG. 18l

SYSTEMS AND METHODS FOR DATA CODING, TRANSMISSION, STORAGE AND DECODING

PRIORITY APPLICATION

This application claims the benefits of U.S. provisional patent application Ser. No. 60/627,856, titled "Systems and Methods for Data Coding, Transmission, Storage and Decoding," filed Nov. 14, 2004, which is incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

The invention relates to provision of data for transmission and/or storage, and to the transmission and storage of data, and, more particularly, to data coding for transmission and/or storage, and decoding of received and/or accessed or retrieved coded data. ("Retrieving" shall refer to retrieving and/or accessing unless the context indicates otherwise.) The invention also relates to the supply of coded data over a network to recipient computer systems that receive the coded data, decode it and use, store or distribute it.

Electronic data, or information, can be provided to recipient computer systems over a network in a number of conventional ways, e.g., using "pull" and "push" type systems. In a pull type system, users request or "pull" information from a remote computer or database or databases over a network, e.g., from a remote server that retrieves the requested information and supplies it to the requesting user over the network.

In a push type system, a computer system typically maintains address information for recipients and subscription, interests or profile or similar information relating to the information that each recipient should receive (e.g., pursuant to a subscription) or desires to receive (e.g., pursuant to interests or other information provided by or collected relating to a recipient). The computer system supplies recipients with relevant information by sending the information to the recipient's address.

U.S. Pat. No. 5,557,798 describes a communication interface for decoupling one software application from another software application, e.g., between data consumer applications and data provider services.

BRIEF SUMMARY

The invention provides for one or more of the following: acquiring, assembling, marshaling, encoding, transmitting, distributing, storing, retrieving, decoding, extracting, demarshaling and using data. In an embodiment of the invention, data is assembled into coded data structures comprising a plurality of fields which, e.g., may contain actual or implied field values, and data associated therewith that relates to the plurality of fields (generally referred to herein as "identifying data"). As used herein, "field" is meant in a broad sense and encompasses, among other things, typed pieces of data, e.g., with well-defined semantics. The coded data structures may be stored and/or transmitted to one or more computer systems for use, storage or distribution.

Embodiments of the invention also provide a coded data structure and/or a data model as disclosed herein, e.g., on a computer-readable medium.

When transmitted in connection with an embodiment of the invention, a coded data structure may be referred to as a "data message" or simply as a "message," and when stored, a coded data structure may be referred to as a "record." Further, as used herein, an "event" may be a form or subset of "message" unless the context indicates otherwise.

Identifying data may be viewed as data that attaches meaning to field values. The identifying data may represent coded data that provides, after one or more operations thereon or therewith, describing data for the plurality of fields in the coded data structure, e.g., data that describes or interprets the data type of the field values and/or the nature or name of the data (e.g., in an embodiment relating to financial data, trade price (e.g., Trade.Price) for a price-valued financial instrument). For example, identifying data provides information that may be used to obtain primitive data types, as well as "variant" types or array types based on primitive types. (Primitive data types in a programming language may represent, e.g., integers in various ranges, strings of characters, Boolean values, etc.) This information can be used, e.g. to allocate memory for field values.

Further, in an embodiment of the invention, identifying data associated with a coded data structure may not only provide a basis for interpreting the field values of the fields of coded data structures, but also function as a descriptor for a coded data structure. Functioning as a descriptor, identifying data may indicate what information is represented by the field values or the nature thereof or by the name of the coded data structure, or represent an action or a type of information associated with a particular coded data structure.

In an embodiment of the invention, identifying data may also include information that relates data from a plurality of fields of a coded data structure as a set of data. In an embodiment of the invention, identifying data is provided as text that, e.g., represents and/or identifies a data model (discussed below) element or elements and/or field types. The text may be used in decoding coded data structures in an embodiment of the invention as a look up to obtain describing data for each of the fields to which the identifying data relates. The text may also serve to provide in human readable form a description of the coded data structure, e.g., "Trade.Price," which as mentioned above, describes data for a price-valuated financial instrument.

In an embodiment of the invention, different types of coded data structures may include fields that, prior to being encoded in or after being decoded from a coded data structure, have the same describing data, e.g., describing data may be reused for the same fields in different coded data structures. In this embodiment, coded data structures can be provided with field values and identifying data which, when decoded, can provide the same describing data for one or more fields of the coded data structure.

In an embodiment of the invention, a coded data structure may include, in addition to a plurality of fields and the identifying data described above, one or more additional fields and describing data associated with each such additional field that describes each such additional field, e.g., provides a data type and/or description. For example, a coded data structure constructed in accordance with an embodiment of the invention may include a plurality of fields and the associated identifying data for the plurality of fields, and one or more additional fields each with associated describing data. In this embodiment, the plurality of fields may be considered, and referred to, as "required fields," and each additional field may be considered, and referred to, as an "optional field." The identifying data for the required fields may, e.g., precede or follow a number of continuous subsequent required fields that together may be referred to as a "required section." In an embodiment of the invention that includes one or more optional fields, the optional field or fields together with the associated describing data are referred to herein as an "optional section." In an embodiment of a coded data structure with an optional section, the optional section follows a required section, although another order may be used. For example, in some embodiments, optional field identifiers may be grouped together with or without intervening field values in between the optional field identifiers.

Optional fields allow applications to distinguish between defaulted values and unavailable or inapplicable values. This permits a more general data model with fewer message types. The market data model described herein, where message types are defined independently of both specific pricing sources (e.g. exchanges) and of asset class (except for reference data) is an example application of this feature.

For data models that are comprised of a large number of fixed message types, the encoding techniques described herein provide an on-the-wire encoding that uses no more space than less flexible formats, such as may be implemented via static structures in a programming language. In the case of a fully general data content model, i.e. one where every field is optionally allowed in a single event type, and no means to implicitly identify included optional fields is provided, then all messages will be fully tagged in transmission. Any content model in between will be encoded as efficiently as is allowed by the structure of the content model.

In general, all tables needed to efficiently encode/decode and interpret messages are precomputed to optimize performance in terms of execution time.

In an embodiment of the invention, an assembling computer system temporarily stores received or retrieved data, and assembles, marshals, encodes and/or populates the data into the coded data structures in accordance with a data model. The terms "assembling," "marshaling," "encoding" and "populating" refer to construction and/or provision of coded data structures, and the terms "disassembling," "demarshaling" and "decoding" refer to reconstituting coded data structures, unless the context indicates otherwise. "Populating" may additionally refer to setting values in a coded data structure, and in the object oriented programming embodiment discussed below, setting values in a coded data object or message.

The term "data model" is used in a broad sense herein, and may encompass concepts and/or functionality represented or performed by elements referred to by terms such as "schema" and "data dictionary," and, unless the context indicates otherwise, these terms may be used interchangeably herein. A data model includes definitions for assembling and disassembling coded data structures within a particular system. These definitions provide for specific coded data structures. Use of the term "data model" may refer to a data model at a high level, or to a part of or definition in a data model as indicated by the context. In an embodiment of the invention, a data model is represented or associated with the identifying data.

An embodiment of a data model for a coded data structure may specify a plurality of fields and identifying data associated with the plurality of fields that contains information relating to the plurality of fields. An embodiment of a data model provides that each type of coded data structure has unique identifying data associated therewith. The identifying data and other data associated with the identifying data, but not part of the coded data structure, cooperate to enable the field values and/or description to be obtained and decoded or extracted. For example, the identifying data and the other data cooperate to provide data that describes the data in the coded data structures (e.g., data that allows memory to be allocated, field values to be obtained, and/or identifies the data in the fields, etc.).

In accordance with an embodiment of the invention, a set or group of coded data structures is provided that includes required fields and one or more implicitly-included optional fields. This embodiment further optimizes coded data structures by providing code data structures with optional fields that do not include an associated describing data field. Instead, the identifying data includes data from which the describing data for the implicitly-included optional fields may be obtained. This further reduces the length of coded data structures that use optimization according to this embodiment.

In an embodiment, a coded data structure may be constructed at the assembling computer system by combining one or more required sections with an optional section (if any). In an embodiment of the invention, the data model, represented by the identifying data, defines the fields that are required and optional (if any) in a coded data structure. These coded data structures may then be transmitted as a feed of messages to recipient sites via any suitable hard-wired or wireless transmission system, or stored, e.g., as records. The recipient sites may receive, or a retrieving computer system may retrieve, these coded data structures and decode them for end user applications, storage or distribution.

A data model provided in accordance with an embodiment of the invention allows the identifying data to be smaller in size as compared to data that itself describes each field in a data structure. In an embodiment of the invention, the identifying data may comprise or consist of text and/or numeric values or identifiers. A coded data structure according to this embodiment may contain content only (identifying data and field values). This allows for a reduction in size of the data structure as compared to, e.g., a data structure that includes program code or all data needed to describe the data in the data structure.

In an embodiment of the invention, data is assembled by an assembling computer system from data provided by one or more sources, e.g., data feeds, ticker plants (in a financial data distribution embodiment), contributors, databases and/or computer systems, internal or local to, or external to or remote from, the assembling computer system, and provided to one or more recipient systems, e.g., as a real time data feed in the field of financial services. (As used herein, a "source" of data is meant in a broad sense, and in a publishing or financial data services environment, encompasses a contributor, which typically may provide value-added services to data provided by another source.) The data may be provided to or acquired by the assembling computer system over a proprietary or public network, e.g., a LAN, WAN, intranet or the Internet. After assembling coded data structures, the assembling computer system may transmit or store the assembled coded data structure, e.g., as part of a data stream or feed.

The term "computer system" is used in a broad sense, and includes, e.g., computers comprising at least one processor and volatile and non-volatile storage accessible thereby and at least one device adapted to input, output, or both. A computer system may also comprise a plurality of connected computers.

For example, in one embodiment, source data received by an assembling computer system, and/or retrieved from storage by a retrieving computer system, may be examined, e.g., parsed, to determine informational content. Such source data may be provided as data sets, which can be arranged in conformance with a predefined data structure may comprise name-value pairs or tagged data pairs, e.g., a name followed by a data value. The data in such data sets may not be position-restricted and may be extendable for new data elements from new or existing sources. Such data sets may have been constructed from data provided by various sources, some or all of which uniquely describe the data that they provide. Once the informational content of a data set has been determined, a coded data structure may be populated with source data, e.g., according to stored rules/and or tables, that includes the field value(s) in the data set and appropriate identifying data, where the identifying data may provide the information described above.

Source data may be preprocessed in accordance with an embodiment of the invention so that the name or tag portion of a source data set is normalized. Preprocessed or intermediate normalized data may be processed into the coded data structure. This facilitates assembling the data in source data into coded data structures.

Regardless of whether data from data sources is preprocessed to provide intermediate normalized data, an embodiment of the invention provides for the coded data structures to contain normalized identifying data and normalized describing data (for embodiments including optional fields). This relieves the assembling computer system of having to convert data, to be supplied to recipient computer systems or to be stored, to different formats to be compatible with different end user systems, which allows the same normalized decoded data to be provided to all recipient and retrieving computer systems. This also allows the same decoding schemes to be used by all recipient and retrieving computer systems to decode received or retrieved coded data structures.

In an embodiment of the invention in which an assembling computer or computers transmits coded data structures to recipient computers, as mentioned above, the coded data structures may be transmitted as a data feed, e.g., pushed to recipient computers. In such an embodiment, different recipient computer systems may be provided with data that is a subset of all data that may be provided by the assembling computer or computers based, e.g., on permissioning information provided in the coded data structure, e.g., as a required field. Recipient computer systems may distribute further subsets based on local filtering or further permissioning the information. Permissioning information, e.g., in the form of an entitlement code, may also be used for billing purposes and internal policing of entitlement rules for users at the data recipient side. An example of an entitlement code in a real time financial data system is "UK1" which is the level one (best bid, ask, and trade data) for the London Stock Exchange.

A decoding process for decoding coded data structures may involve consulting a data model (hereafter referred to as "data model" with respect to decoding coded data structures), which may be located, for example, at a recipient site or data retrieval site, for use in decoding at least the required section of coded data structures. (A data model may be referred to herein as "assembly" or "disassembly" data model depending upon whether the data model is involved in assembling (or populating or marshaling) data structures or disassembling (or decoding or demarshaling) coded data structures.) In an embodiment of the invention, one or more data models are provided to a recipient or retrieving computer system, which uses the data model(s) to decode received or retrieved coded data structures. In accordance with an embodiment of the invention, the recipient or retrieving computer systems provided with the data model(s) decode or interpret the coded data structures by associating a data model with a coded data structure via the identifying data. For coded data structures with an optional field or fields, the describing data may describe the associated field or may indicate describing data contained in a data model.

An embodiment of the invention provides for a recipient or retrieving computer system to already have access to the data model(s) when it receives or retrieves coded data structures. For example, the data model(s) may be provided prior to a recipient or retrieving computer system receiving or retrieving a coded data structure. In an embodiment, data model(s) are implemented at a recipient or retrieving computer system as a run time engine, and are available for use in decoding as coded data structures are received or retrieved.

A decoding process conducted in accordance with an embodiment of the invention may include: receiving coded data structures from a transmitting assembling computer system e.g., as a feed, or retrieving coded data structures from storage; decoding the identifying data described above to obtain describing data for interpreting or decoding a plurality of fields of a coded data structure to which the identifying data relates; and obtaining or otherwise extracting the data, e.g., field values, from such fields based on the describing data obtained from the data model(s). The information obtained from decoding the identifying data may include data field definitions, field identifiers, data types, e.g., character or integer, and lengths, e.g., fixed or variable. If an optional field or fields is present in a coded data structure, the decoding process extracts the data value from the optional field using the describing data associated with each optional field or obtained from a data model. Decoded information may also include information relating to reconstruction of a set of data from the various fields of a coded data structure.

The extraction process may include rearranging or combining fields to create or recreate information constructed at the assembling computer system for subsequent use with application programs. The extraction process may also include selecting and/or processing specific pieces of information based on the needs of a particular application program.

In an embodiment of the invention, feed handlers may be provided to perform or assist in performing the decoding. A generic feed handler may iterate over field values in each coded data structure, while a specific feed handler may be registered for a specific coded data structure or structures (e.g., as represented by the identifying data). Feed handlers retrieve the field values from the coded data structures and allocate storage pursuant to the describing data provided by the appropriate data model. The feed handlers may also perform application processing.

An embodiment of the invention may also include systems and methods for distributing data over a network by assembling coded data structures or data messages in an assembling computer system in accordance with at least one data message assembly model wherein the data message assembly model provides for data messages each of which may include a plurality of data fields which each may include a field value relating to financial data, and an identifying field including data that is insufficient for directly interpreting the field values of the plurality of field values but sufficient for indirectly interpreting the field values of the plurality of field values, and at least one additional data field including a field value and an associated data field. Such data message may be assembled by the assembling computer in accordance with the data message assembly model and sent to a plurality of consumer computer systems over the network.

The consumer computer systems may each include at least one data message disassembly model by which data sufficient for directly interpreting the field values of each of the plurality of fields of a data message can be obtained using the identifying data of the data message, the data message disassembly model corresponding to the data message assembly model in accordance with which the respective data message was assembled. The data message disassembly model is preferably provided to the plurality of consumer computers separate from the data stream containing data messages that are to be interpreted using the data message disassembly model. Data sufficient to interpret the data in the received messages is obtained using the identifying data in the data message and the corresponding data disassembly model.

In another embodiment, the data message assembly model provides for coded data structures or data messages comprising (a) the plurality of data fields described above, and (b) at least one additional data field comprising a field value and an associated data field. The data messages assembled by the assembling computer in accordance with the data message assembly model are transmitted in a data stream to the plurality of consumer computer systems over the network. The plurality of consumer computer systems are provided with at least one data message disassembly model by which (a) data sufficient for directly interpreting the field values of each of the plurality of fields of a data message can be obtained using the identifying data of the data message, the at least one data message disassembly model corresponding to the at least one data message assembly model in accordance with which the respective data message was assembled, and (b) if the data in the associated field with the at least one additional field is not sufficient to directly interpret the field value in the at least one additional field, data sufficient to directly interpret the field value of the at least one additional field, and the at least one data message disassembly model being provided to the plurality of consumer computers separate from the data stream containing data messages which are to be interpreted using the at least one data message disassembly model. Data sufficient to directly interpret the field values in the plurality of fields and the at least one additional field of the received data messages is obtained using the identifying data, and if necessary, using the data in an associated data field.

Another embodiment of the invention provides a system and method for assembling, transmitting and disassembling data messages as described above that allows the assembling computer system to periodically update a data model or models used by consumer computer systems to decode the data messages such that the data messages need not be restricted to a static predefined set of message types.

In an embodiment of the invention, message definitions are provided for decoding the identifying data and a computer system is provided that includes a master database of preprogrammed message definitions that may be selected by the data provider for periodically updating the message definitions in the client-side data model.

A system according to an embodiment of the invention may include a consolidation component that receives electronic data from a plurality of data sources; a normalization component that adds identifying data to at least certain sections of the electronic data and arranges the electronic data that includes the identifying data according to a predefined data model to create a coded data structure; a transmission component that transmits the coded data structure to at least one end user as a data message; a client-side or disassembling data model.

Embodiments of the invention may employ object oriented programming ("OOP") techniques, e.g., to assemble the inventive coded data structures described above and/or to decode coded data structures. For example, in an OOP embodiment, data (e.g., source data in the data sets referred to above) received by an assembling computer system, and/or data retrieved from storage, may be examined to determine an object class (e.g., the data model described above) to which the data relates, and then processed according to the class definition of the determined object to provide objects that are instances of the determined object class. Such objects comprise the coded data structures described above.

In an OOP embodiment, classes may represent generic elements of the data (or content) model, e.g. enumerations, fields, or message types. Specific object instances within each class may be accessible via lookup using a unique identifier, e.g. a text name, an example of which in a real time financial information embodiment is "Trade.Size". Objects of different classes can have the same name.

The identifying data may thus comprise or consist of the object's name (e.g., in text), which need not have a length restriction, e.g., text names or descriptions of varying length may be used, and need not conform to identifiers that are legal in a particular programming language. As discussed below, use of text as the identifying data facilitates decoding in embodiments of the invention utilizing a data model in which the identifying data functions as a look-up to obtain describing data for the fields related to the identifying data in coded data structures.

As discussed above, according to an embodiment of the invention, the identifying data may comprise or function as descriptor. Functioning as a descriptor, the identifying data may represent an action or a type of information associated with a particular object. Where implemented by OOP, a plurality of classes may define a plurality of types of coded data structures, e.g., messages and events, which are instances of each class. (In a financial services embodiment, for example, coded data structures may include information of trades, quotes, market depth, news, research, summary information reference information, etc. As such, a coded data structure may be referred to as a message, which typically provides information not necessarily limited to trade or other event information.) Such instances provide objects of the class that may be in the form of different coded data structures.

With respect to decoding coded data structures in an OOP embodiment, coded data structures may be exposed as object instances of a class of data structures, e.g., messages or records, to a data model or models that are instances of a data model class.

An embodiment of a method of assembling a data structure comprises using OOP. The method comprises instantiating objects of a class as coded data structures pursuant to a definition in the programming of a class for the data structure, each class including a plurality of data fields each comprising a field value of data and an identifying field associated therewith, wherein the class definition includes an identifying field that does not include data sufficient for directly interpreting field values in the plurality of data fields, and providing a data model which provides describing data based on the data in the identifying field of a respective data structure for directly interpreting the field values in a respective data structure.

Programming techniques other than OOP may also be used to implement the functionality disclosed herein, including assembling, transmitting, storing and disassembling coded data structures as disclosed herein.

As mentioned above, a run time engine may interpret a data model. In an embodiment of the invention, a data model is created as an object, e.g., in the C++ programming language, and receives data in coded data structures as instances of objects. In this embodiment, a data model defines a field catalog and a set of identifying data. In an embodiment of the invention, all data model objects are created and owned by the run time engine for the life of a particular application process. Changes to a data model may be transmitted along with other data, e.g., as part of a data feed. An updated data model may then be available for use as a recipient computer system receives coded data structures. However, an earlier version of a data model may be maintained to decode data structures that were created to be decoded according to the earlier version. According to this embodiment, it would not be necessary to restart a recipient computer system process when an updated data model is provided. In an embodiment of the invention, data model objects are instantiated as singletons. ("Singleton" is a term of art in OOP for a design pattern in which only one instance of some particular class may exist.)

A data model may be viewed differently by developers of producer and consumer applications, and by a data modeler. For example, a data model for use by a modeler may be stored in a database or as an XML document that is created and edited using a graphical editor. Developers of producer applications may receive a "run-time" data model file, e.g., a binary file, and consult human-readable documentation, e.g. as can be manually or automatically generated in HTML, PDF, plain-text, or other suitable formats. A special-purpose application can generate binary versions of the content model in an appropriate format suitable for transmission over a feed or as a file; e.g., in one embodiment, this format is depicted in FIG. 17. Such binary files may be desirable in some embodiments as generally being smaller in size and easier to parse.

One possible application of the invention involves supplying real time financial information including financial transaction information, e.g., the content of the coded data structures may include stock prices, trade information, etc. The world of financial real-time market data is as varied and robust as any global information domain. In this domain, the defining characteristic of real-time market data is the trading or pricing mechanism that generates the information. Such financial applications typically involve high data volumes, and performance is typically limited by the bandwidth and processing capabilities of the transmission system.

In a real time financial information embodiment, an assembling or producer computer system provides data to recipient or consumer computer systems. As described above, a producer computer system may receive data from sources, e.g., as data sets, and preprocess the data, e.g., normalizing the data. Normalized data to be coded, whether in a source or preprocessed format, or another normalized format, are assembled into coded data structures as messages or events pursuant to a data model, as described above, and transmitted to consumer computer systems which decode the messages using a data model provided by a run real time engine, as described above. A message or event data model specifies message or event types (via identifying data), which define the fields in the message, as described above.

Coded data structures may include dynamic or real time information, such as ticker and trade information, and static information such as company information. A particular coded data structure may include dynamic information, static information, or both. In a financial services embodiment, coded data structures may include information related to trades, quotes, summary information, market depth, etc. As mentioned above, coded data structures, at least in a financial services embodiment, may be referred to as "messages" and "events". Events are structured around the purpose and entities of the market data. Most of a given source's data is centered on assets such as securities or instruments traded and quoted in the marketplace or exchange. However, financial information useful in a financial real time market data includes other data.

A large majority of the market data messages are events at the security level. These events include trades, quotes, market depth, summary messages, and security status. In an embodiment, a producer system may use a unique identifier (Producer ID) and a source identifier to uniquely identify a security. A market data source is an exchange or pricing contributor that uniquely identifies the market data originator. In the case of an NYSE listed security, this would be the market center originator of the data such as the Chicago Stock Exchange, the Archipelago Stock Exchange, or the NYSE. In the case of a composite market data source such as the US composite for exchange traded securities, it is possible to have a local market data source in additional to the composite data source. With a composite daily high price, the security reference may be the US composite such as "INTC US", and the exchange that generated the high price may be the Cincinnati Stock Exchange or NASDAQ. The local market data source is an optional field, so on non-composite securities, it not present and only the data source with be available. In an embodiment of the invention, the market data source ("MD.Source") may be a required field for all security-level events. Some securities are traded on multiple sources and have either a system-calculated or source calculated composite security with its own quotation and summary values. Composite data can be determined by the source name, which may be included in a Source enumeration in a data model.

Embodiments of the invention recognize that there are some events and fields in common for nearly all data sources and some that are unique to one data source. Embodiments of coded data structures including required and optional fields facilitates creation of a consistent market data feed that accommodates the variation of the multitude of data sources in the marketplace.

Examples of event types include: "trade," "quote," "summary," "market depth," "page," "status," and "reference," as discussed in more detail below. As mentioned, a catalog of fields may be provided which may be used with different events. Examples of fields are: ask price of a financial instrument (e.g., with name "Quote.Ask.Price"); and the size of an ask quote of a financial instrument (e.g., with name "Quote.Ask.Size"). An example of an event type message is "Quote.Ask.Price" (a field and an event may have the same name), which includes fields having the following illustrative names: "MD.Security.ID," "MD.Source," "Quote.Ask.Price" and "Quote.Ask.Size." In this example, the identifying data is the event, "Quote.Ask.Price."

With respect to decoding, a data model according to an embodiment of the invention is created as a singleton, and event handlers, described above, are registered to decode specific events. Identifying data in a coded data structure may be used as a callback for a particular event handler. Event handlers retrieve field values from coded data structures, e.g., messages, and may perform application processing. Values may be retrieved using a field handle (a field pointer) or by iteration. Some events require processing to render intended data (e.g., volume weighted average price ("VWAP"), market depth, page-based data), and the appropriate event handler provides such processing.

In embodiments of the invention in which coded data structures contain normalized data, a generic software developers' kit may be provided for use at recipient and retrieving computers systems for application developers to apply or expose decoded data to applications.

Embodiments of the invention provide for supply and storage of data with reduced bandwidth. For example, coded data structures need not include describing data such as field types, or field identification for each field in a required section. Also, describing data for fields in an optional section need only include field identification, which can be accomplished with a single byte. Further, use of dynamic enumerations allows efficient coding (typically one byte) to describe string constants (where the list is provided to a recipient or retrieving computer). Embodiments of the invention also use variable length integer coding for, e.g., for string sizes, numeric ids, etc.

An embodiment of the invention that provides real time financial information is described in more detail below.

BRIEF DESCRIPTION OF THE DRAWINGS

In the accompanying drawings, like reference characters refer to like or corresponding elements throughout.

FIGS. 5-12 depict text versions of exemplary definitions in a data model for events and other data used by the system of FIG. 4 for assembling coded data structures in accordance with an embodiment of the invention.

FIGS. 13-14 depict text versions of exemplary definitions in a data model for fields used by the system depicted in FIG. 4 for decoding coded data structures in accordance with an embodiment of the invention.

FIG. 15 depicts a text version of exemplary definitions in a data model for enumeration fields used by the system depicted in FIG. 4 for decoding coded data structures in accordance with an embodiment of the invention.

FIG. 17 depicts a binary file format for a data model in accordance with an embodiment of the invention.

FIG. 18a-18l depicts a hierarchical arrangement of classes and associated objects in accordance with an embodiment of the invention.

DETAILED DESCRIPTION OF THE PREFERRED EMBODIMENTS

Figure 1:
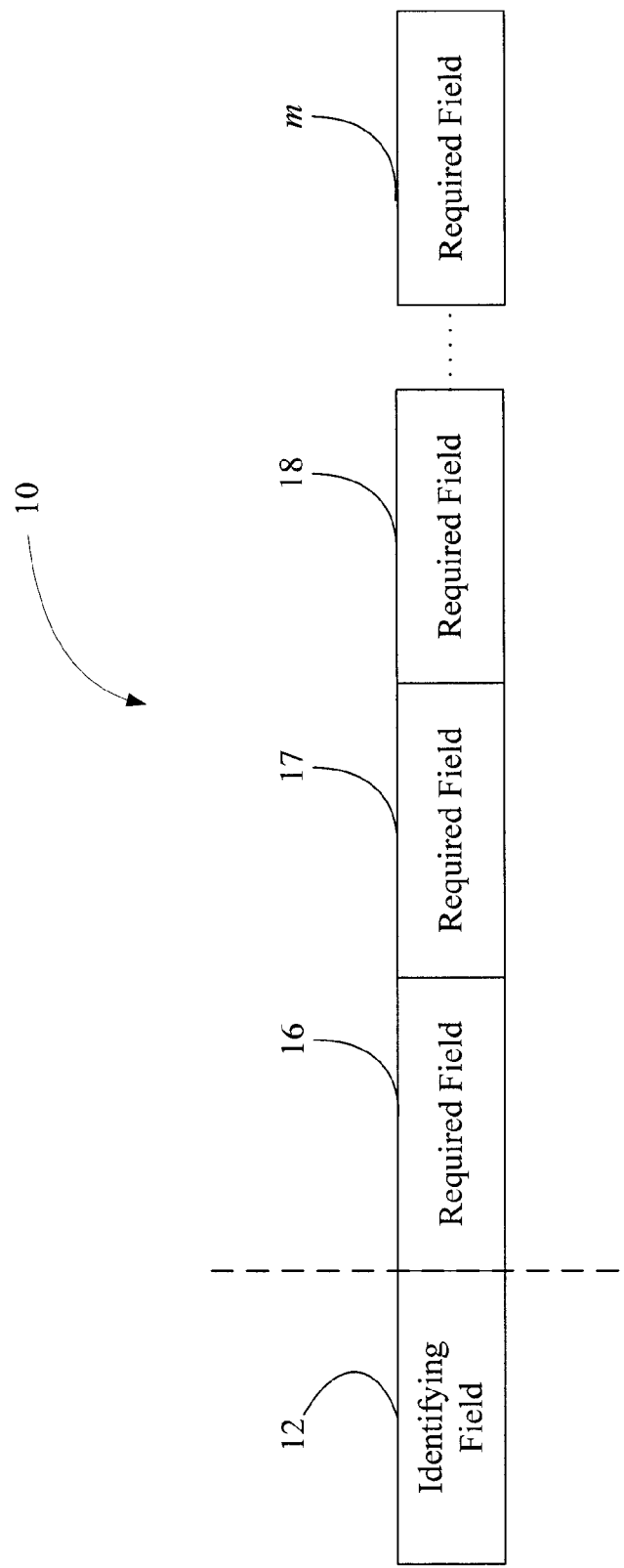
FIG. 1 is a diagram depicting a representation of a coded data structure according to an embodiment of the invention with required fields.

An embodiment of a coded data structure 10, as described herein and represented in FIG. 1, comprises a field 12 for identifying data (described herein) ("identifying field"), and data fields 16-18, m adjacent thereto. Each of the data fields 16-18, m contains a value, as described herein, e.g., representing a typed piece of data. Information relating to values in the data fields 16-18, m, e.g., type information for the values in fields 16-18, m, and/or an identification of the data in the fields, is contained in the identifying field 12. In this embodiment, only the identifying field 12 contains information relating to the values in and identities of fields 16-18, m that follow identifying field 12. Individual tags or fields with describing data relating to the data in respective individual data fields 16-18, m are not provided in the embodiment represented by FIG. 1., i.e., in the embodiment represented by FIG. 1, the identifying data in field 12 is related to all of the other fields in the data structure 10.

Figure 2:
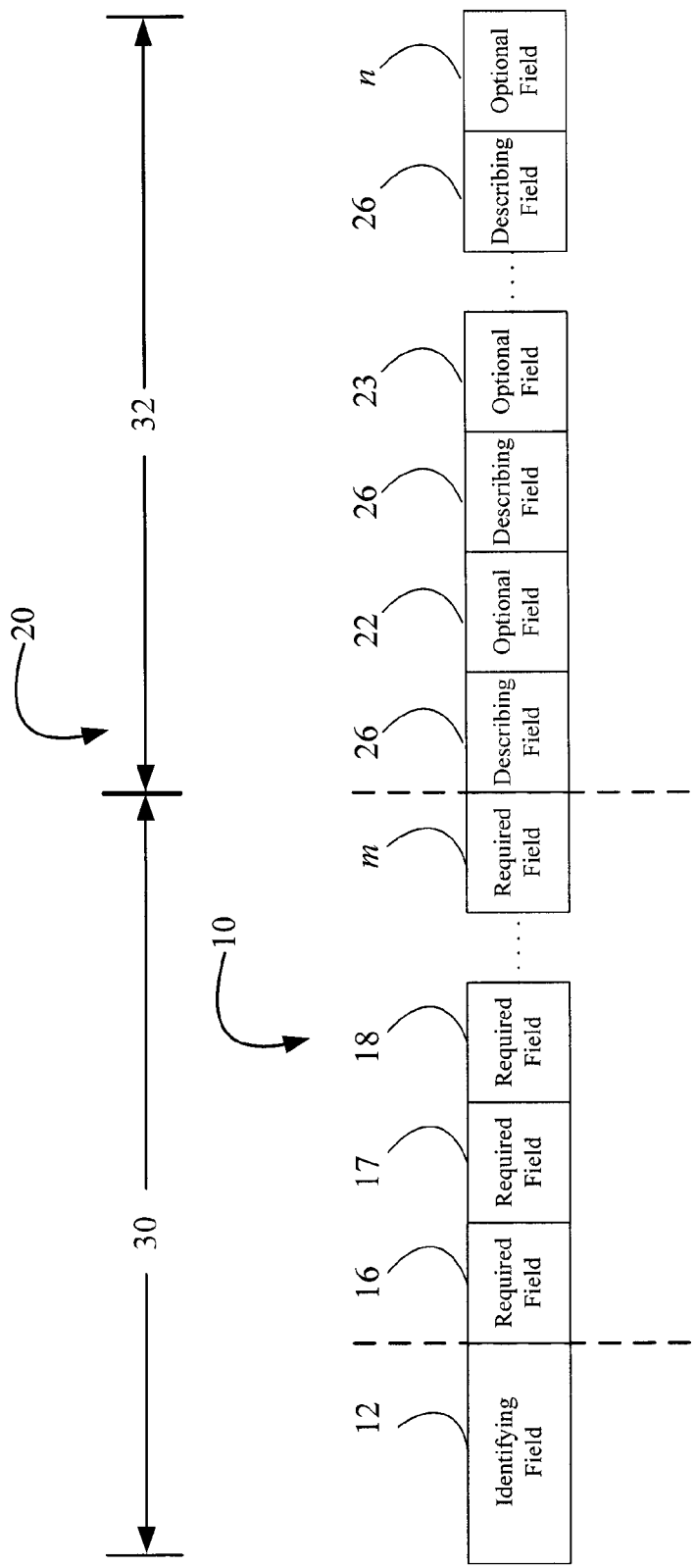
FIG. 2 is a diagram depicting a representation of a coded data structure according to another embodiment of the invention with required and optional fields.

FIG. 2 represents an embodiment of a coded data structure 20 that includes an identifying field 12, related data fields 16-18, m, and additional data fields 22, 23, n, to which the identifying data in identifying field 12 need not relate. Adjacent to (in this representation, preceding) each of additional data fields 22, 23, n is a describing field 26 containing describing data for the value in the adjacent data field. The describing data in a describing field 26 in this embodiment describes the data in the adjacent data field, e.g., describes the data type of the value in the adjacent field and possibly its identity. Although the identifying data in identifying field 12 in FIG. 2 need not describe the data in fields 16-18, m, the identifying data may be related to the data in fields 16-18, m, e.g., such as indicating that these fields are or may be part of the coded data structure 20 represented in FIG. 2.

In the embodiment represented in FIG. 2, the coded data structure 20 includes a required section 30, comprising an identifying field 12 and two or more related data fields 16-18, m ("required fields"), and an optional section 32, comprising one or more additional data fields 22, 23, n ("optional fields") and related describing data in individual describing fields 26. In embodiments of the coded data structure 20, optional fields 22, 23, and related describing fields 26 data may precede or follow any required section.

In other embodiments, a coded data structure may comprise a plurality of required sections, e.g., a first identifying data field followed by a first plurality of related fields, and a second identifying data field followed by a second plurality of related fields. In such embodiments, the coded data structures may include one or more additional or optional fields, each with an adjacent describing data field. An additional field or fields and a related describing data field or fields may follow all required sections or precede or follow individual required sections. Coded data structures may be constructed such that certain default values are implied if no specific data is present in an optional or required field, which reduces the overall length of a coded data structure.

Figure 2A:
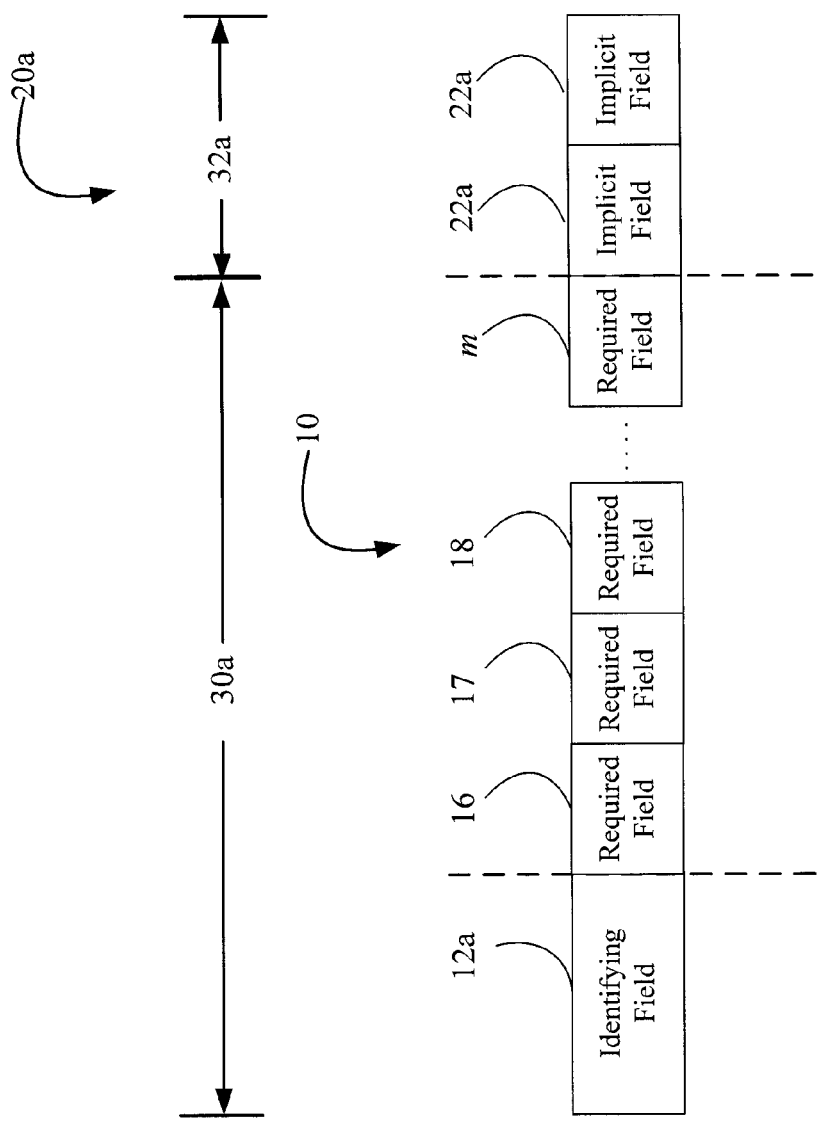
FIG. 2a is a diagram, similar that of FIG. 2, depicting a representation of a coded data structure according to another embodiment of the invention with required and implicitly included optional fields.

As mentioned above, a set or group of coded data structures provided in accordance with an embodiment of the invention includes required fields and one or more implicitly-included optional fields. As mentioned, this embodiment further optimizes coded data structures for space by providing code data structures with optional fields that do not include an associated describing data field. Instead, the identifying data includes data from which the describing data for the implicitly-included optional fields may be obtained. This further reduces the length of coded data structures that use optimization according to this embodiment. As depicted in FIG. 2a, the coded data structure 20a includes a required section 30a and an optional section 32a, which includes the implicitly-included optional fields 22a. In this embodiment, the optional section 32a does not include a describing field (26 in FIG. 2) for each optional field. Instead, the identifying field 12 is modified to provide identifying field 12a as described for this embodiment.

In this optimized embodiment of the invention, the identifying data specifies the implicitly-included optional fields. As discussed herein, identifying data may comprise data identifying an event. For ease of description, this embodiment, in which identifying data specifies implicitly-included optional fields, is described in connection with event coded data structures, although it may be used with other coded data structures, and coded data structures that are messages. In an embodiment in which a message includes required fields and explicitly-included optional fields, the identifying data may be referred to as an "event id." In this embodiment, in which implicitly-included optional fields are provided in event messages, the identifying data is referred to as an "event+ id." An event+ id in such an embodiment of the invention is a number that identifies a particular event and a set of implicitly-included optional fields. An event+ id with an empty list of optional fields is the same as an event id. Field value information encoded by the event+ id could include, e.g., merely the field's presence (in the case of an implied field); a specific length for a string value; a specific implied value; a reference indicating that the field's value equals that of another field; a value type, in the case of a "variant" field type; a particular encoding format or method; etc.

At both assembling and disassembling computer systems, event+ id mapping tables are provided for use in assembling and disassembling event+ id messages, which include a message type and a list of implicitly-included optional fields, where the message type implies a set of required fields. These tables can be included as part of the data model definition at the assembling and disassembling ends. At the assembling end, the event+ id specifies required fields and implicitly-included optional fields, and may also specify one or more explicitly-included optional fields. At the disassembling end, decoding the event+ id provides the data needed to determine the message type and parse the message's data values, including required fields, implicitly-included optional fields, and explicitly-included optional fields, if any. The explicitly-included fields have field ids as described above and depicted in, e.g., FIG. 13. An event+ id is therefore not needed for every possible combination of optional fields, since there can be a mixture of implicitly-included and explicitly-included fields.

In another embodiment of the invention, an event+ id can imply a set of field values for a subset of the message's fields (required and/or optional), wherein a further space optimization is achieved by not sending field values for the fields whose specific values are implied by the event+ id since they can be reconstituted at the receiving end based on shared data model definitions that include a specification of fields with implied values and those values. In this embodiment, the logic applied when populating (setting) or removing field values can be modified to check whether a new field value will allow the use of an event+ id. This can be used advantageously in a market data application for Boolean update action flags; e.g. a typical trade message may indicate that the total volume is to be increased and that the trade is eligible to update a VWAP (Volume Weighted Average Price). Instead of requiring two additional bytes to send these flags as separate Booleans, or introducing the inconvenience of a bit field, a single event+ id can be allocated for use with trades that have these two flags set (the vast majority of all trades).

At the disassembling end, event+ id mapping tables are provided to decode event/event+ id data to data needed to parse the messages. At a minimum, this will include the event definition itself (e.g. at run time the table could provide a pointer to an EventTypeImpl object, e.g., see FIG. 18). The event definition can include the list of required fields and mapping tables for parsing explicitly-included optional fields, i.e. for obtaining a field definition given an optional field id unique for the particular event. An event+ id mapping table must further provide the list of implicitly-included optional fields. This completes the information needed to parse messages. The event+ id mapping tables can be included as part of the data model definition that is shared at the assembling and disassembling ends.

At the sender side, a "current" event+ id is maintained for each message as the message is populated using the functions that populate a message's field values (e.g., SDMessage::set( . . . )). A current event+ id initially is the event id, assuming the message initially does not have any optional fields populated. An assembling computer system sender can maintain another set of event+ id-to-new-event+ id transition tables, for each event+ id. These tables that map optional fields being newly populated or added to a message initially without such fields (i.e., fields going from absent to present in a message) and provide a new event+ id. Optionally, a parallel set of tables can provide mappings for optional fields that are removed from a message (i.e., fields going from present in a message to absent), and similarly also provide a new event+ id. These tables can either be loaded by the assembling computer system as part of a data model definition or derived on the fly from definitions of event+ ids.

The event+ id transition tables could be huge if exhaustive (and could also use up a limited set of event+ ids rather quickly). But the tables' size may be made manageable in a number of ways: e.g. by not including transitions for all events (e.g., including only high-volume events, which in a market data application, would typically be quotes and market depth events instead of trades) or for all event+ ids, by not including transitions for field removals, by not including transitions for particular fields (e.g. only fields that are frequently found in high-volume messages), or by not including transitions for particular fields for specific event+ ids (i.e. implying that fields should be populated in a particular order for efficiency). If an absent optional field is populated and the event+ id transition tables for field population do not provide a transition to a new event+ id, then the current event+ id remains unchanged and the field will be sent as an explicitly-included optional field. If a field is present in a message and is removed, and the current set of implicitly-included optional fields (as determined by the current event+ id) is consulted. If the field is not part of the current set of implicitly-included optional fields, then the event+ id remains unchanged. If the field is part of the current set of implicitly-included optional fields, then the event+ id transition tables for field removal for the specific current event+ id are consulted, if available. If the tables are not available and do not contain an entry for the field in question, then the current event+ id can revert to the event id (i.e. with no implicitly-included optional fields) and all other optional fields would be sent explicitly, i.e. message size encoding optimization derived from using implicitly-included optional fields is lost. Alternatively, at the expense of computation time, the set of event+ ids for the event in question could be searched to find one containing the remaining optional fields (or a subset thereof), and this selected as the new current event+ id. This would allow for at least some message size encoding optimization.

An embodiment of the invention may employ an alternative to transition tables that is based on hashing, which is a technique well known in the art. An event+ id encodes information about field values, and it is possible to represent the portion of the field value information encoded by the event+ id by a token. A possible token may comprise, e.g., a field identifier and a field value length (or a dummy value if a length is not applicable to the field). As the message is populated, an order-insensitive hash function, such as is known in the art, is applied to tokens corresponding to field values as they are set. A complete set of tokens is also maintained for the message.

An embodiment of the invention that so uses hashing maintains a "hash table" that allows retrieval of event+ ids (and, depending on the embodiment, the associated tokens) using the corresponding values calculated by the hash function. This hash table may be smaller than a transition table as above for an equivalent range of possible event+ ids because it covers only final field value configurations for which an event+ id has been allocated, but not intermediate configurations encountered along the way.

When the coded data structure has been assembled, the new hash value may be used as a key in the hash table to look for an event+ id with the same hash value. If a matching hash value is found, the corresponding event+ id is retrieved, and the set of tokens associated with the found event+ id is compared with that of the newly-coded data structure. If the two sets of tokens are equal, then the found event+ id is used in assembling the coded structure for the message.

An embodiment of the invention may apply another alternative to transition tables by computing a final event+ id when the coded data structure is assembled. For example, an embodiment of the invention may search within the set of known event+ ids for the one that represents the greatest amount of the message content. (Examples of ways to measure the amount of message content represented include, but are not limited to, the total number of bytes of encoded identifying data, field values, or string field lengths, among other things.) Optionally, these totals may be precomputed once for each event+ id. An event+ id can then be selected using any of a variety of search algorithms, well-known in the art, e.g., iterating through all event+ id's, traversing binary trees based on the absence and/or presence of optional fields, etc.

Methods for assembling coded data structures 10, 20 and populating the fields of the coded data structures are described below, as are methods for decoding the coded data structures and obtaining the values in the required and optional fields, if any. With respect to assembly and population, a data model may be used, e.g., object oriented programming may be used to assemble and populate coded data structures as objects according to one or more class definitions. With respect to decoding, a data model or models may be used to decode fields related to an identifying data field, e.g., the data model or models are provided for use in decoding other than as part of or separately from a coded data structure that is being decoded using the data model(s). Data model and message data will typically be represented in one way in memory and in another way during transmission or storage. In each case, the representation is preferably appropriate to the profile of operations that are performed on the data. For example, an object that is being used by a client software program will typically represent integers in the host computer's byte order, while for transmission or storage, a standardized format such as network byte order (NBO) could be used, even if it is not the same ordering as the host computer's. Additionally, depending on various optimization trade-offs or expected usage patterns, it may be desirable to support several different implementations.

Figure 3:
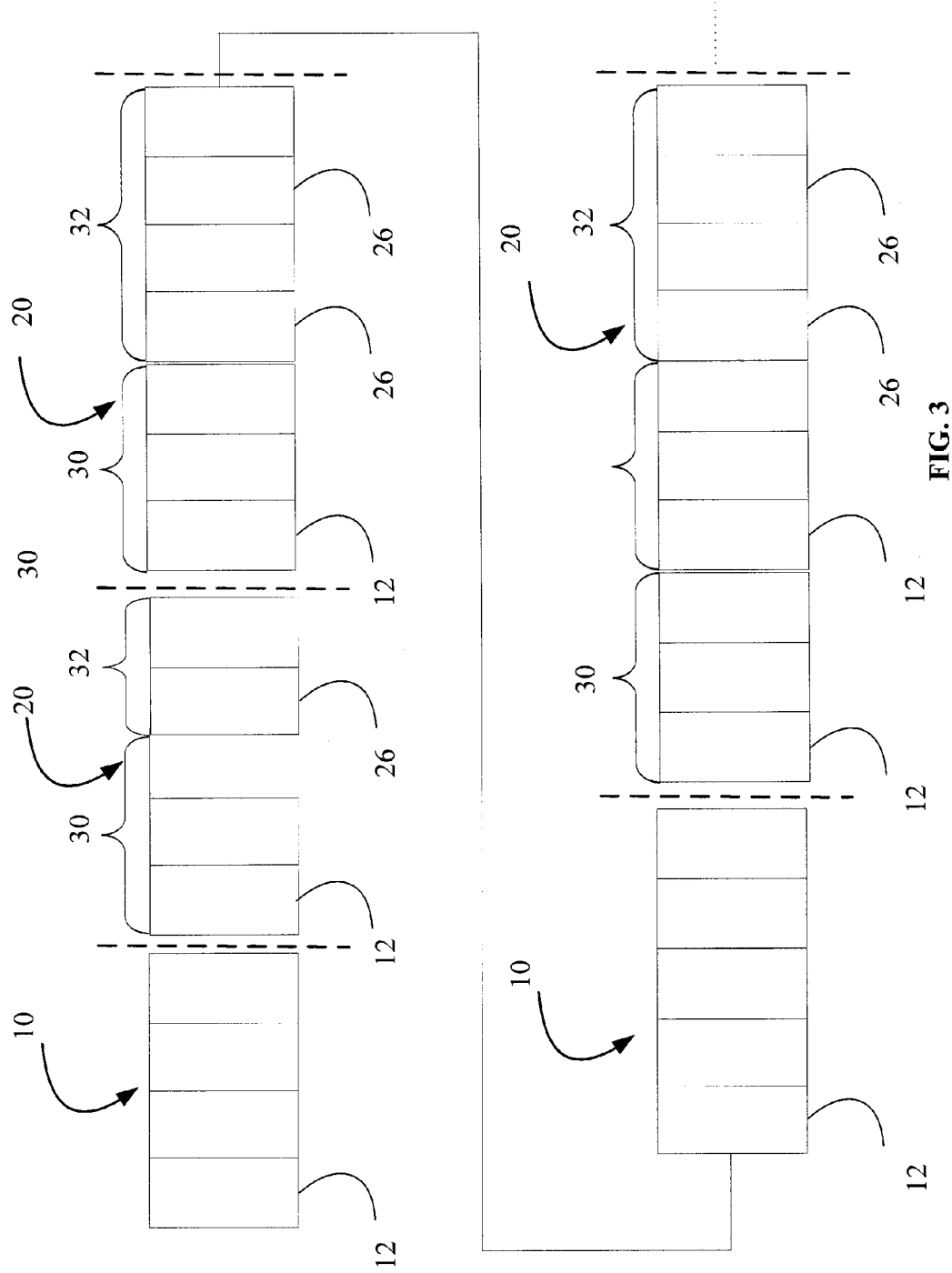
FIG. 3 is a diagram depicting a representation of a data stream or feed of a number of messages composed of data structures of the type represented in FIGS. 1 and 2.

FIG. 3 schematically depicts a stream or feed of coded data structures, e.g., the coded data structures 10 and 20 represented in FIGS. 1 and 2, respectively. The coded data structures or the stream may also include information that indicates the beginning and/or end of each coded data structure or data message, as is conventional in the art. For example, such information may be contained in a message header (not shown) or a message terminator (also not shown).

In the embodiment described below, a system 100, depicted in FIG. 4, includes one or more producer computer systems 102 (also referred as an assembling computer system) that assembles and provides coded data structures to a plurality of consumer computer systems 106 (also referred to a recipient computer systems). However, embodiments of the invention may provide coded data structures for storage and subsequent retrieval and decoding. Although the coded data structures may contain various types of information, the exemplary system 100 described below provides coded data structures containing real time financial data for decoding and use by consumer or client computer systems, e.g., financial services companies. Therefore, the description of system 100 below is intended to be illustrative of systems other than the one described below used in applications other than real time financial data distribution.

More than one producer computer system 102 may be provided, and data may be provided by such producer computer systems to one or more consumer computer systems 106. As represented by consolidation block 108 in FIG. 4, producer system 102 receives and consolidates data received from various sources 110, which, as mentioned may be local to or remote from, or internal or external to producer system 102. After consolidation in consolidation block 108, the data is provided to normalization block 112 for normalization and other processing. Consolidation block 108 may perform some or all of the functions typically performed by a ticker plant. Normalization performed in block 112 provides coded data structures, e.g., as represented by FIGS. 1 and 2. The coded data structures provided by normalization block 112 are distributed, via distribution blocks 114, as a data stream or field to consumer computer systems 106 over communications paths 1116. Consumer computer systems 106 decode coded data structures provided by producer computer system 102, as represented by feed handler block 120, and distribute the decoded data for use by client applications, for storage, and/or for further distribution, as represented by distribution/use/storage block 122.

The consumer computer systems 106 may include caches, data storage and servers, as would be typical for client sites that receive real time financial data.

The producer computer system 102 and the consumer computer systems 106 may comprise conventional computer networks, computers, processors and other components that are configured and/or programmed to carry out the functionality described herein.

Communication paths 116 may encompass any suitable wired or wireless link between a producer computer system 102 and a consumer computer 106, e.g., over any suitable proprietary or public network such a WAN, LAN, intranet or the Internet. In an embodiment, the communication paths 116 are suitable in, e.g., data transmission speed, bandwidth and security, for the transmission of real-time financial data. In an embodiment in which financial data is distributed (and/or stored), sources 110 may comprise exchanges (e.g., stock, futures and commodity exchanges), ECNs, ticker plants, financial instrument trading institutions, brokers, financial institutions, contributors, news organizations, etc.

Normalization in block 112 assembles the data values and the associated identifying data into (or populates) the coded data structures 10, 20 (FIGS. 1 and 2). As discussed herein, coded data structures 10, 20 include one or more required sections and may include one or more optional fields 23. Normalization block 112 provides data fields with field values to distribution blocks 114. Normalization block 112 may also preprocess data, e.g., preprocess data sets (or pieces of data), from one or more sources 110 prior to populating the coded data structures.

Distribution blocks 114 may code the data fields according to a given standard or standards, e.g., IEEE 754. In some embodiments, single or multiple messages may be encoded using multiple encoding formats. Distribution blocks 114 may also provide for encryption and/or compression, and may provide for processing the coded data structures into a suitable transmission format, e.g., plaintext TCP/IP, open SSL-Encrypted TCP/IP, UDP unicast, PGM multicast, etc. Alternatively, these functions may be performed in consolidation blocks 108, or some may be performed in normalization block 112 and some in distribution blocks 114. Various tasks performed in normalization block 112 (and distribution blocks 114) may occur in any suitable order.

The stream or feed of data messages (FIG. 3) provided by normalization block 112 is distributed to consumer computers 106 via distribution blocks 114 and transmission paths 116. Distribution blocks 114 include suitable components, e.g., hardware and software, for transmitting the messages provided by normalization block 112, and for performing other functions, e.g., as described above.

Normalization block 112 (FIG. 4) may include converting source data values to intermediate data in which the data sets are normalized and arranged into coded data structures. Normalization block 112 may further examine each data set provided by consolidation block 108 and determine the nature and/or type of data in the data field of the data set in accordance with the describing data in the data set. For example, different financial exchanges may provide field values, e.g., for bid or ask prices for a particular financial interest traded on the exchange, but use different describing data and/or standards to describe the nature and type of the data in a particular field. A data message from a source may contain a number of data sets, e.g., security ID, source ID, time, nature of a price or other data in the message (e.g., high, low, close, etc.). Normalization block 112 may include a conversion database for use in converting the data sets to intermediate normalized data sets. For example, the rules may be stored for a NASDAQ trade. Such particularized intermediate normalized data may then be assembled into coded data structures. A selected table may also specify reference data to be included in coded data structures. Such reference data is typically static and provided by a reference data processor from a reference database. Reference data is typically provided in an optional section of a data message.

Normalization block 112 (FIG. 4) includes or has access to sufficient memory to receive data from consolidation block 108, temporarily store, pause and convert the data into intermediate data, and temporarily store and convert the intermediate data to coded data structures.

In embodiments of the invention that employ object oriented programming and organization techniques, source data sets received from consolidation block 108 (FIG. 4) may be parsed and stored as intermediate objects according to class definitions available in normalization block 1112. These intermediate objects may be temporarily stored for access by processing routines, which may convert these intermediate objects into message or event objects (which each include at least one required section and may also include an optional section) in accordance with certain class definitions.

A message (or event) object is an instance of a message (or event) class or data model. Text versions of message definitions in a data model for a "Quote.Ask.Price.MarketDepth" event and a "ByLevel.Ask.Discount" event are depicted in FIGS. 6 and 8. Message classes or types specify required fields and optional fields. A message instance or object associates field values with all fields, required and optional, of a message (or event). Message class or type also specifies the order of the required and optional fields in a message object. The message objects are accessed by distribution blocks 114 and transmitted to consumer computers 106 as a data feed or stream (FIG. 3).

Field and message (event) objects may be named hierarchically. FIGS. 5-15 depict text versions of exemplary definitions in a data model for events, summary and reference data, fields and enumerations. For example, FIGS. 5-8 respectively depict text versions in the data model for the events (including tradable securities), "MarketDepth.ByLevel.Ask.Price," "Quote.Ask.Price," "MarketDepth.ByLevel.Ask.Spread" and "Quote.Ask.Spread." FIGS. 9-12 respectively depict text versions in the data model for status, page, summary and reference data. FIGS. 13-15 depict text versions in the data model for exemplary field (FIGS. 13 and 14) and enumeration data (FIG. 15). The event "Quote.Ask.Price" represented by the definition in FIG. 6 is a price event, and no action is associated with that event. FIG. 5 depicts a text version of a definition for a "MarketDepth.ByLevel.Ask.Discount" event that involves an action. The action is indicated by the "MarketDepth.TableCommand" field. As these data model definitions demonstrate, message, event and field names are preferably meaningful and preferably provide a description of the message, event or field.

Figure 16:
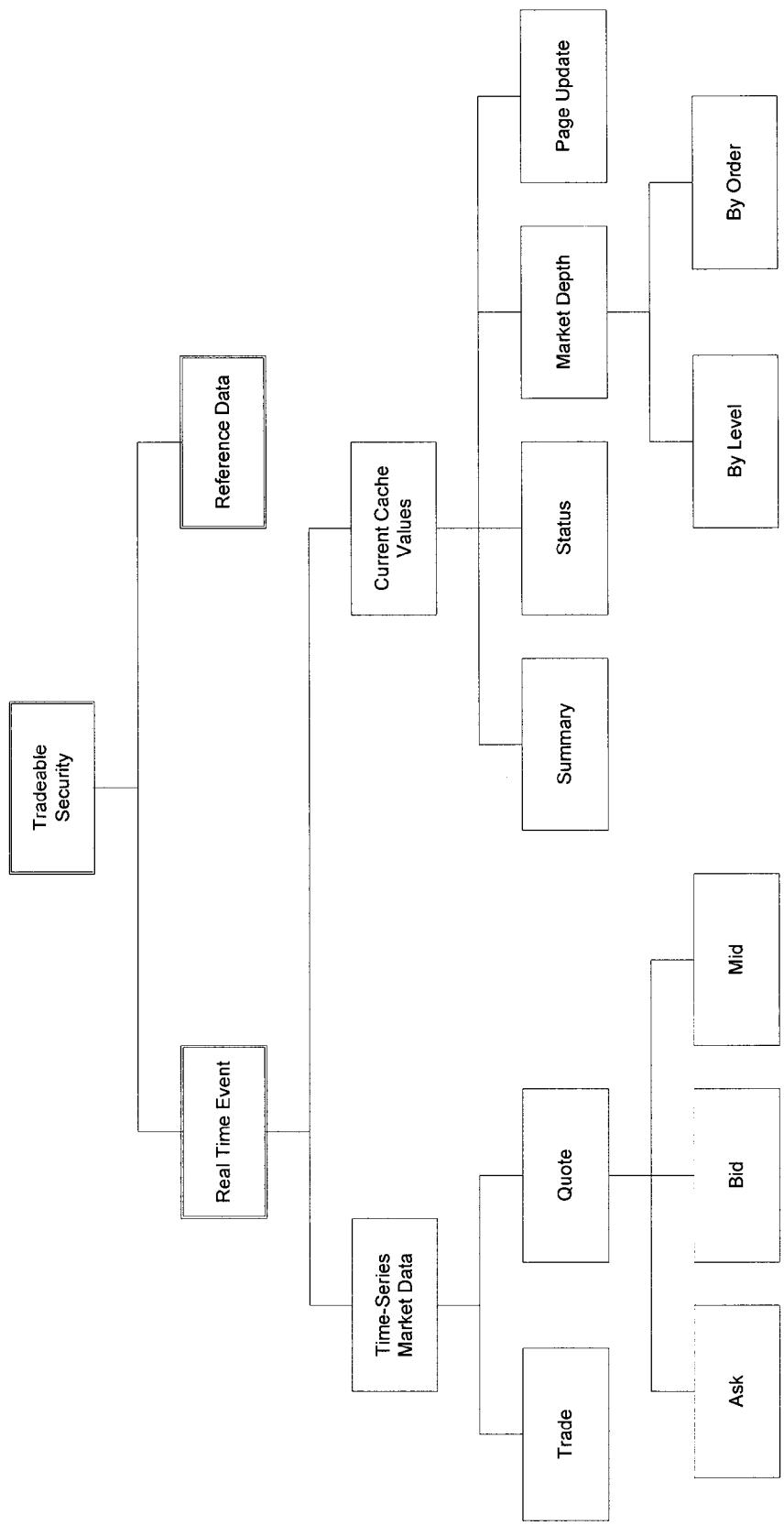
FIG. 16 depicts a hierarchical arrangement of data relating to a tradable security.
Figure 18A:
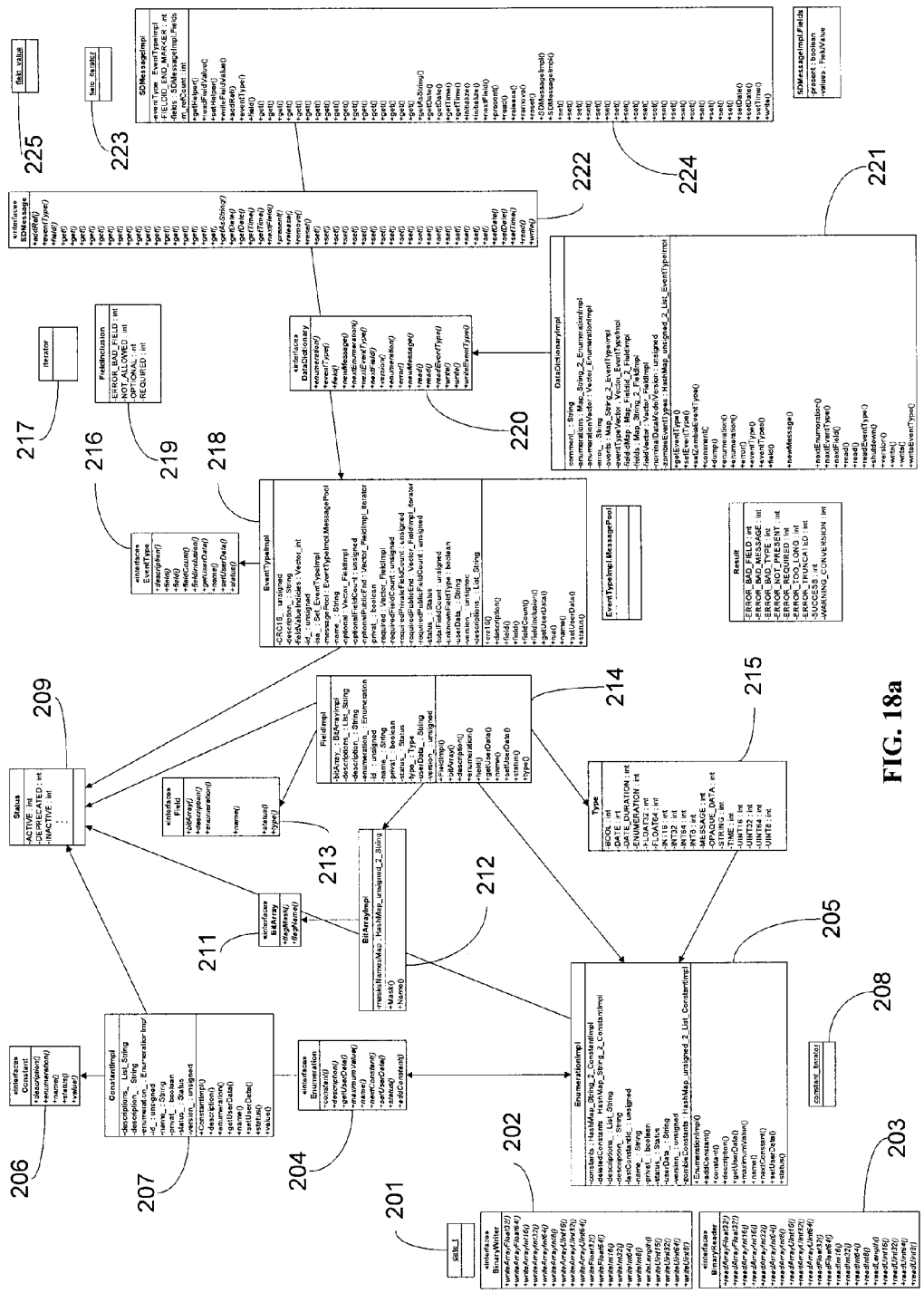
Figures 18B, 18C:
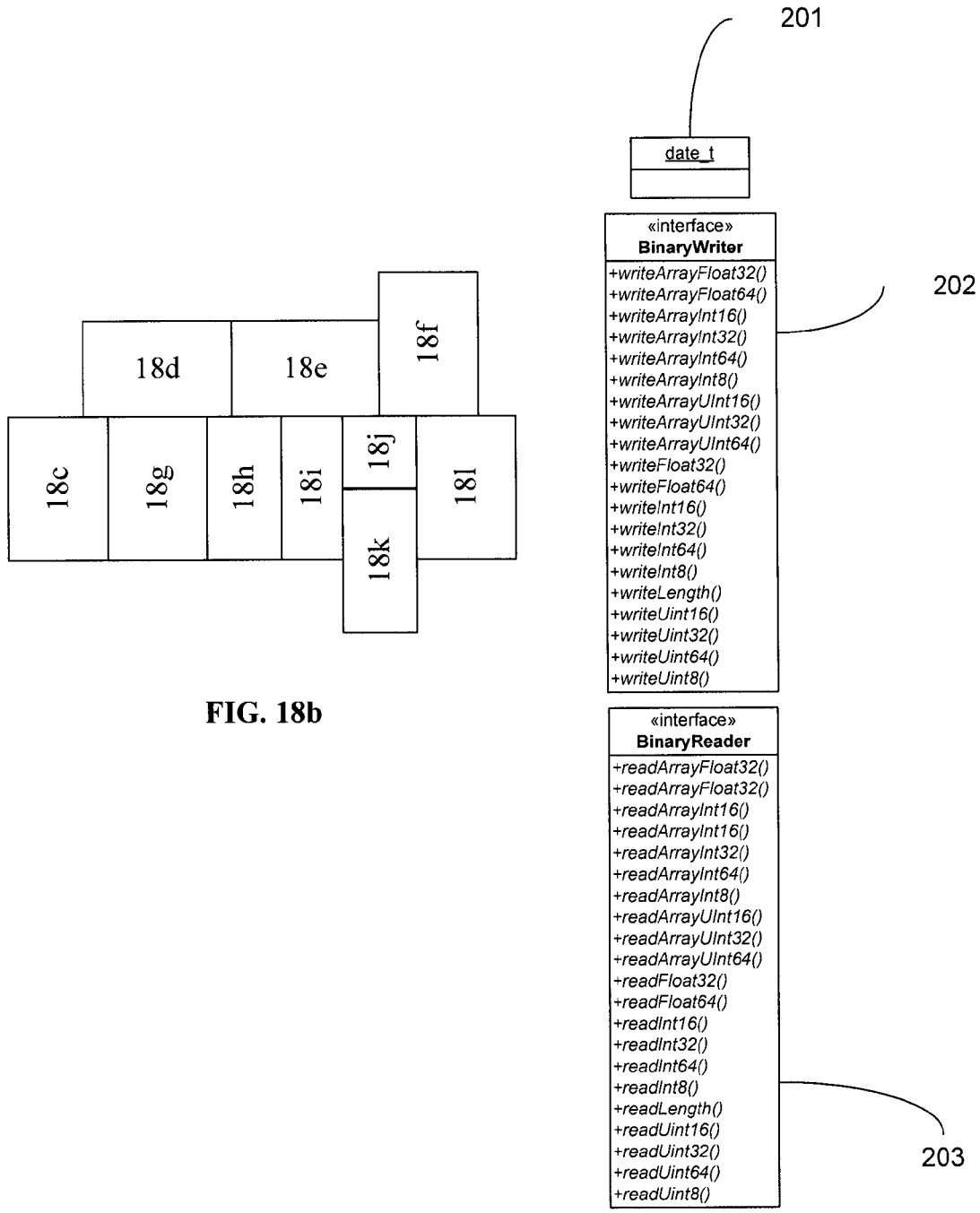
Figure 18D:
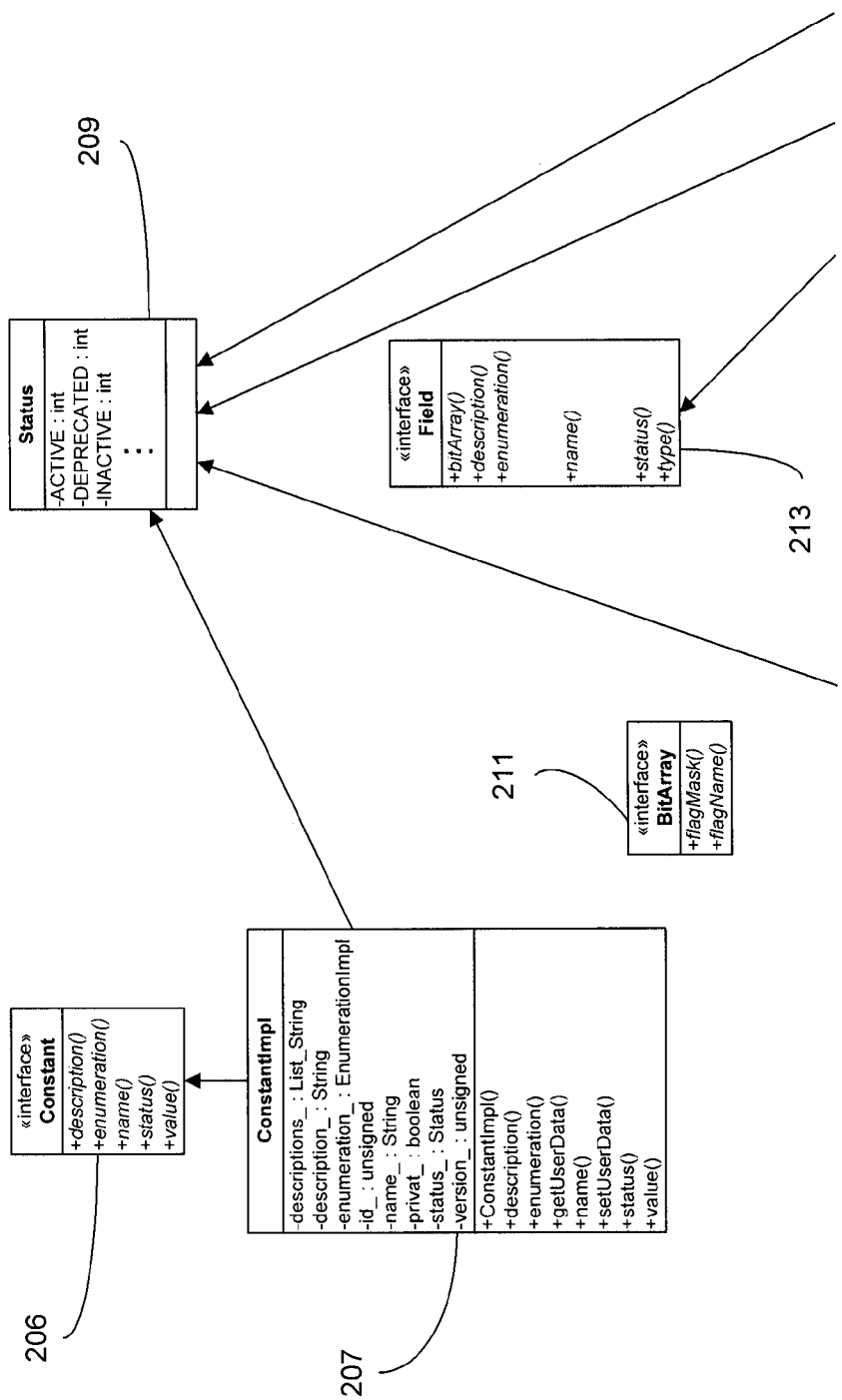
Figure 18E:
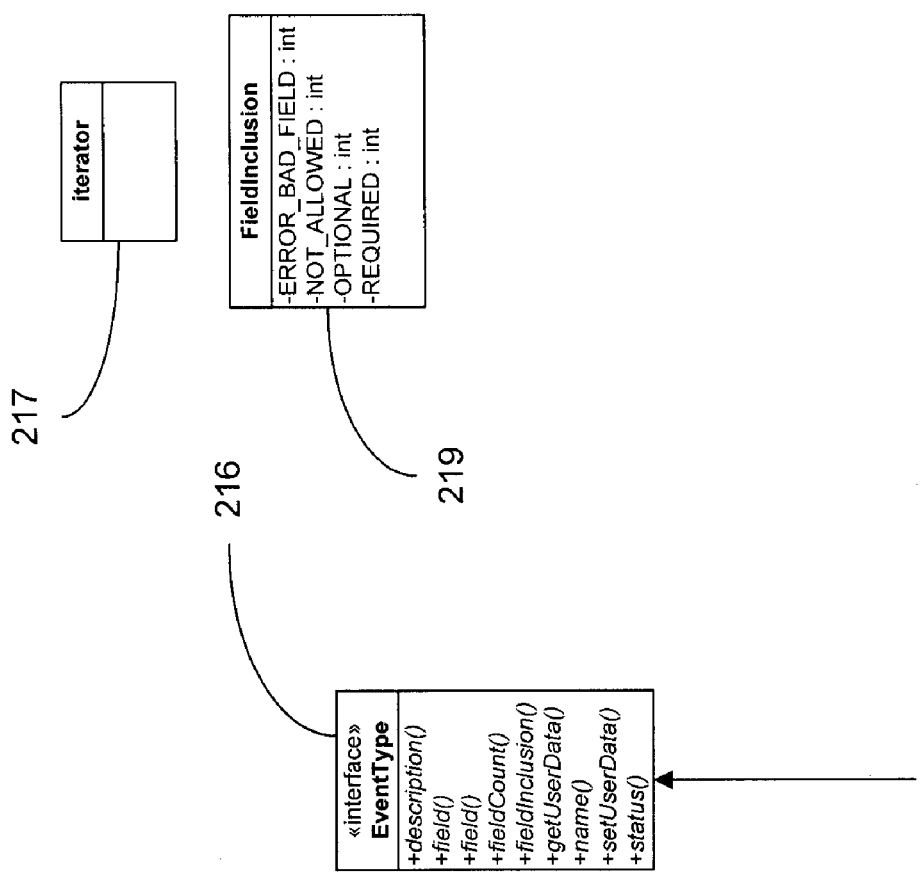
Figure 18F:
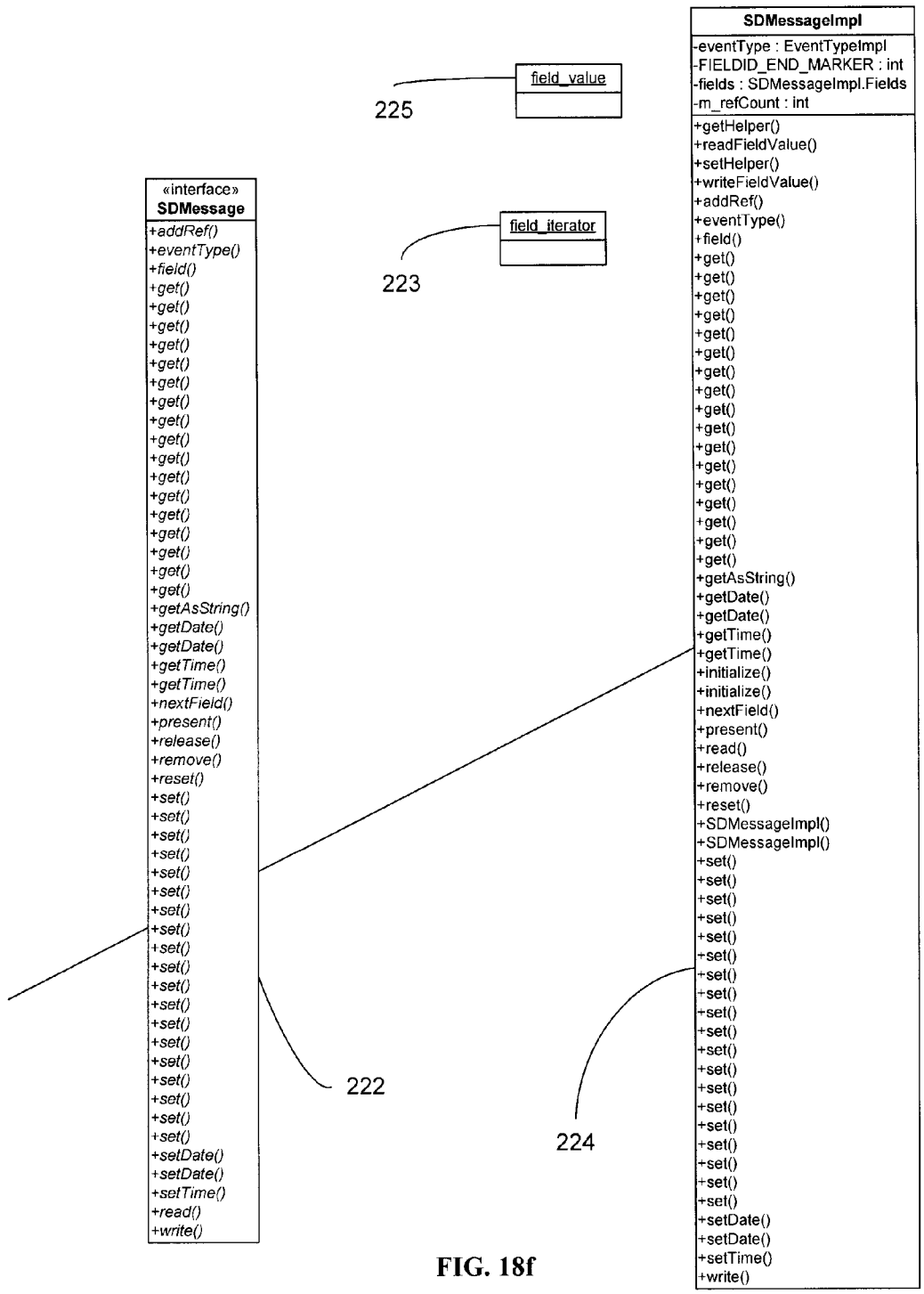
Figure 18G:
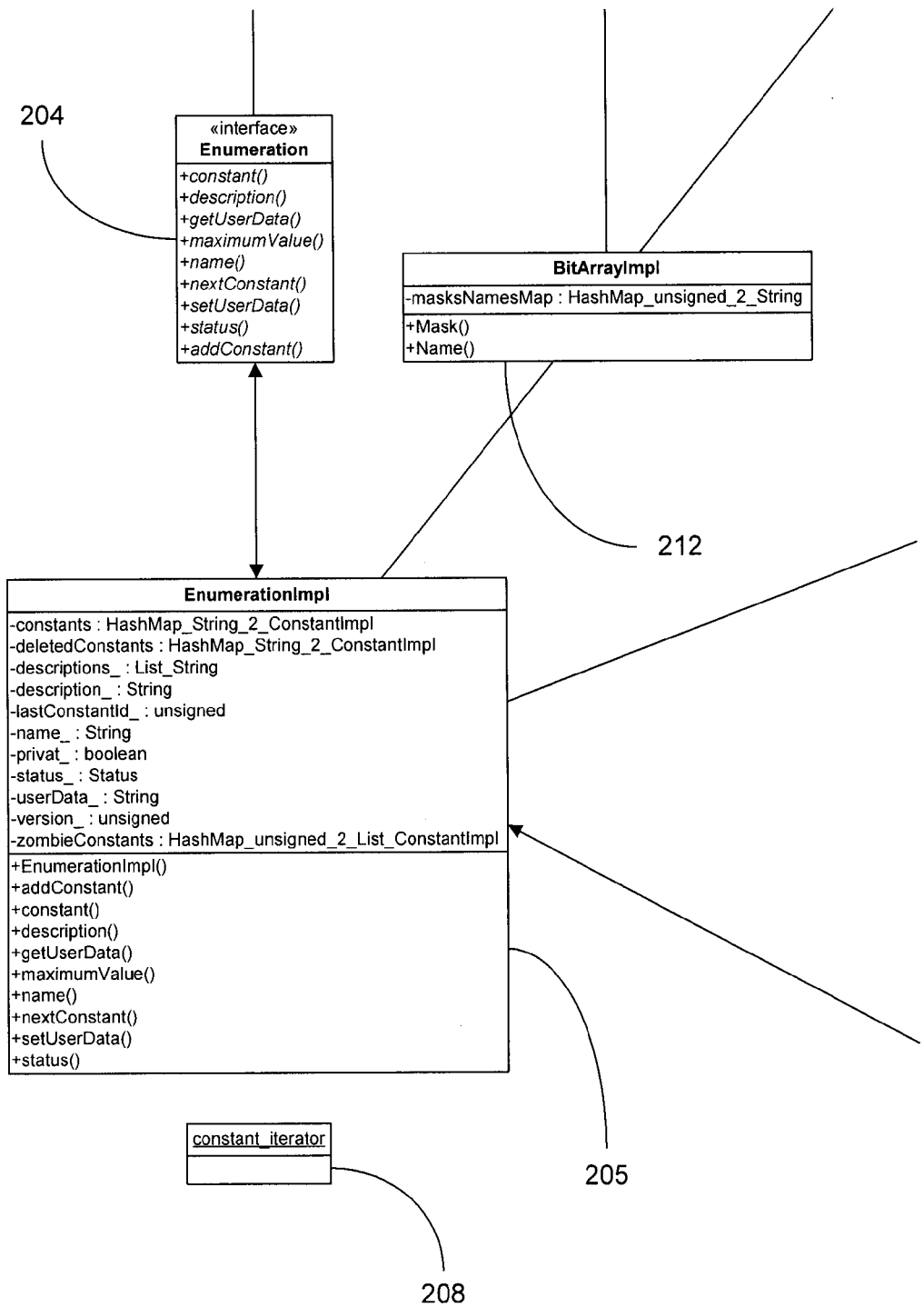
Figure 18H:
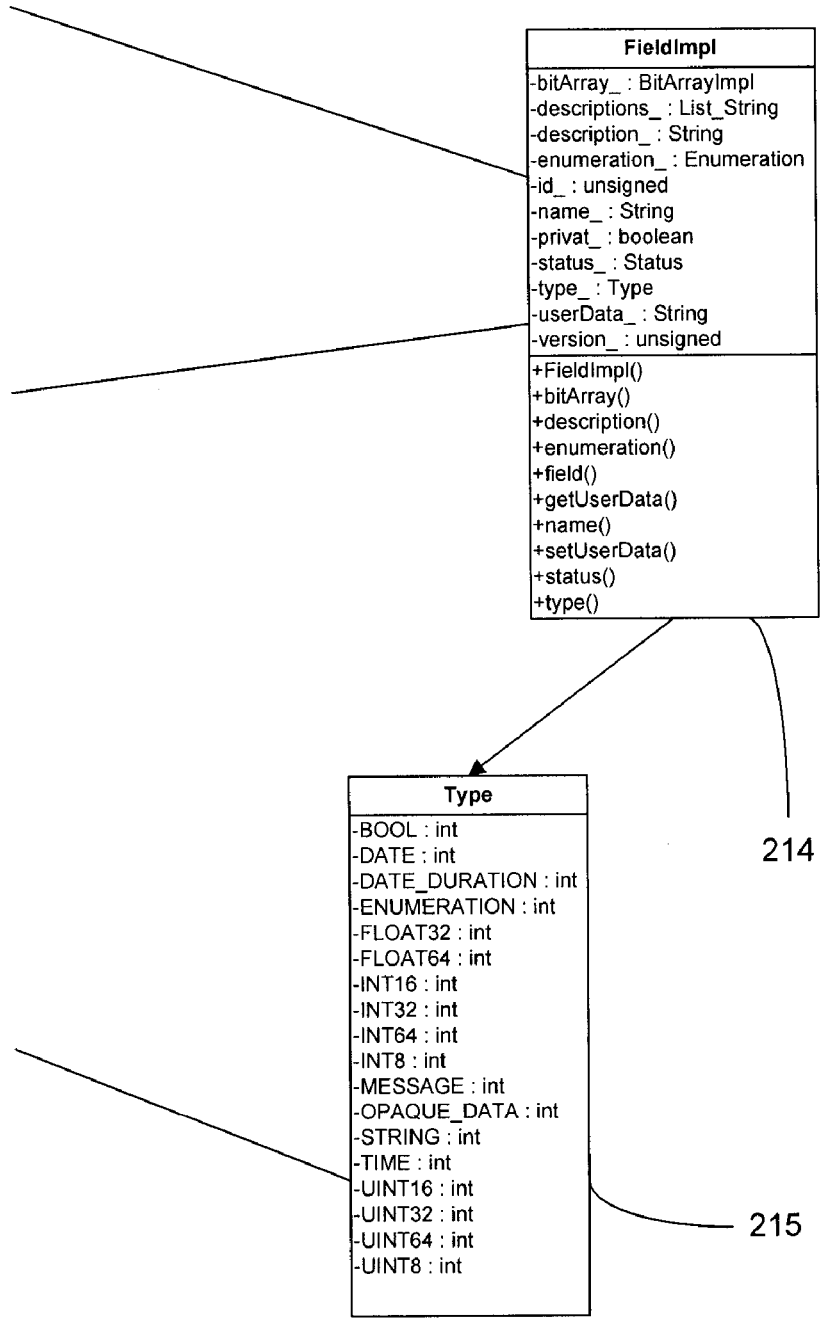
Figure 18I:
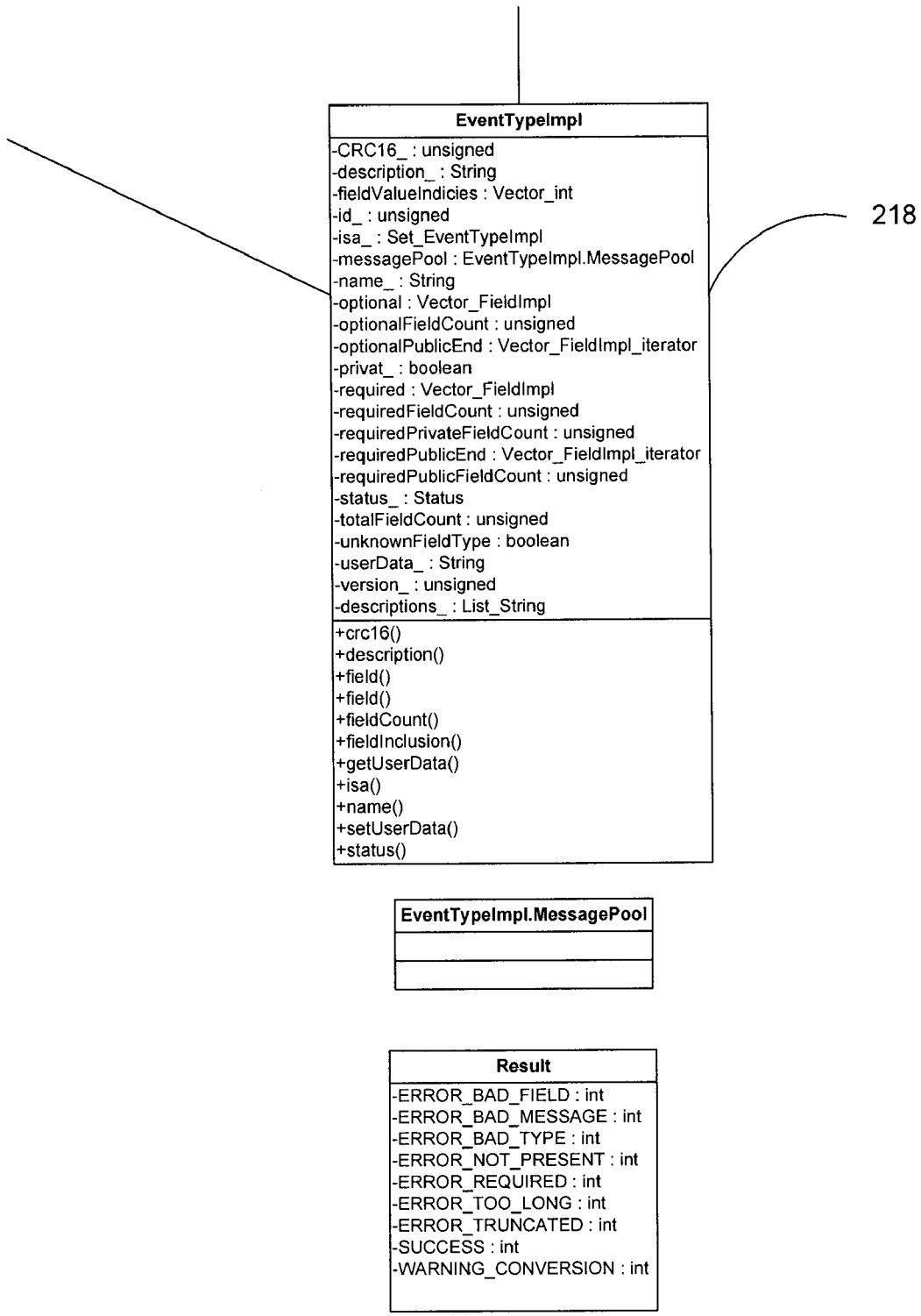
Figure 18J:
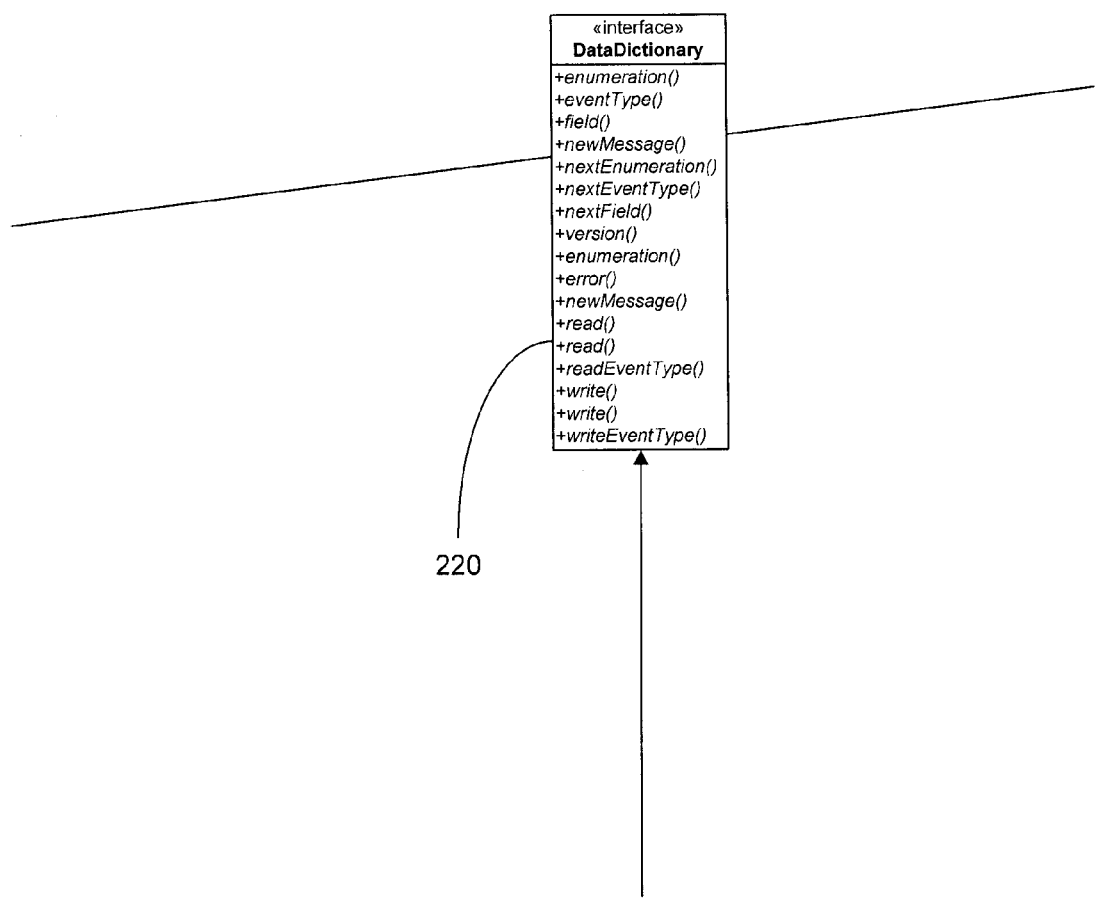

Real-time events are either a time series event or a cache event, as illustrated in FIG. 16. In the case of a time series event, the user of the data may be interested in the previous trade or quote should the recipient be calculating their own value added or storing information a time and trades or time and quotes intraday database.

Real-time events may be distributed multiple times per session as often as a source generates the related information. Real-time market information may include last values and tick history, market depth and page based data. Real-time events may be security level messages and source level messages, which are generally administrative. A large number of messages may be at the security level, and may include: "trade," "quote," "summary," "market depth," "page," "status" and "reference" messages.

A trade event represents as a transaction reported by a source for execution. Trade events are intended to provide information for tick history as well as an update a cache of last values. Separate trade events exist for each price type (e.g., price, yield, discount, spread). A quote event represents bid, ask or mid-information reported by a market source. Quote events are intended to provide information for tick history as well as an update to the cache of last values. Separate quote events exist for each price type. Summary events are used to prime and refresh last value cache that summarize the daily activity of a security's pricing and value added calculations. Market depth events represent changes in price levels or individual order providing greater visibility into a source's book. Separate market depth events exist for market data by level and market data by order and price type combination. Page messages represent a refresh of page data or the metadata necessary to parse and display the page based data. Security status messages indicate special conditions or alerts related to the traded instrument. Separate status messages exist for major conditions reported by a source. Reference messages are provided to aid in establishing context and support for identification symbology and relationships between the myriad of market data instruments. Separate reference messages exist for major classifications of market data instruments. Additionally, reference messages exist for page data and source information.

Summary messages (FIG. 11 depicts a text version of a summary message data model) provide values that summarize the daily activity of a security's pricing and value added calculations. When an opening, refresh or end-of-day summary event occurs, all summary fields applicable to the security and source will be sent. In the case of an intraday summary event, only the fields that have changed will be sent. Additionally, when a trade impacts the summary value (such as daily statistics) these fields are passed on in the trade event.

As discussed above, messages and events are composed of required and optional fields. Fields exist independently of the messages and events that use them, so any commonality is readily exploitable by application programmers: that is to say, the same code that processes a "trade size" field for an equity trade event can process that field for an options trade event. Optional fields may not be relevant to all sources.

Fields may contain time-series market data and cache data. Market data fields may include data relating to a trade and quote (e.g., ask, bid, mid price. yield, spread or discount). Cache value fields may include summary data, status data, market depth data and page data. Consumer computer systems and/or end users replace a cached value with a new value passed in a cache event message. Entitlement codes by which data is distributed to (or accessible by) consumer applications are contained in an entitlement field, which in an embodiment of the invention is a required field for all of the events described above. As mentioned, a catalog of fields may be provided which may be used with different events.

Reference information messages provide generally static information. Reference data is preferably primed prior to the transmission of real-time events and generally is not disseminated unless new events, e.g., based on new securities, are added during a trading session. Reference data may be security reference data (sometimes referred to as security master) and source reference data.

Examples of fields are: the ask price of a financial instrument (e.g., with name "Quote.Ask.Price") and the size of an ask quote of a financial instrument (e.g., with name "Quote.Ask.Size"). An example of an event type message is "Quote.Ask.Price" (a field and an event may have the same name), which includes fields having the following illustrative names: "MD.Security.ID," "MD.Source," "Quote.Ask.Price" and "Quote.Ask.Size." In this example, the identifying data is the event, "Quote.Ask.Price."

As mentioned above, one application of the invention is to provide real time financial data to data consumers. In this embodiment, the invention can provide an enterprise level, high bandwidth, low-latency feed of real-time market data.

Figure 4:
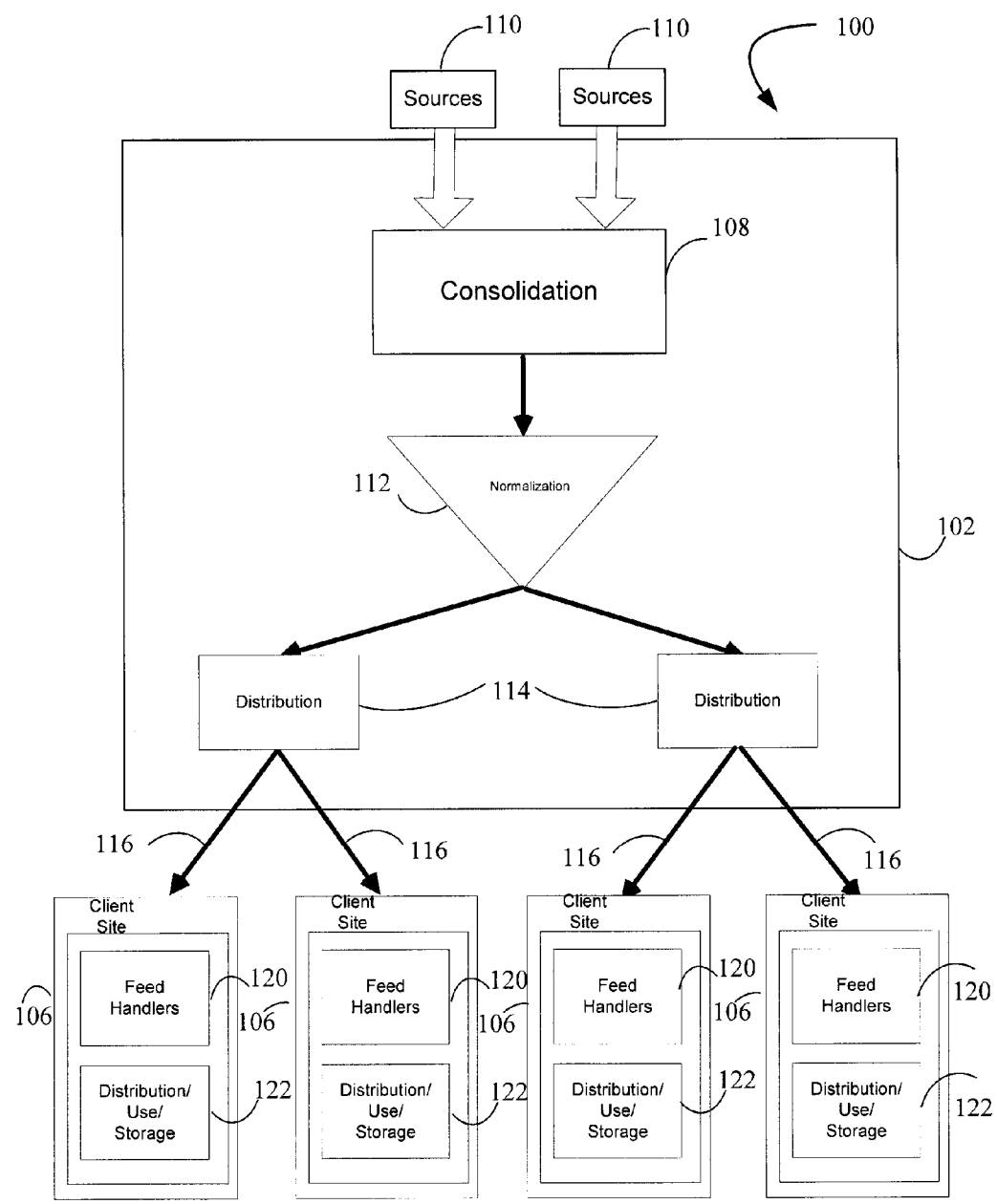
FIG. 4 is a block diagram of a system according to an embodiment of the invention for assembling coded data structures of the type represented in FIGS. 1 and 2, distributing the assembled coded data structures in a stream or feed of the type represented in FIG. 3 to client sites, and decoding the coded data structures at the client sites.

Referring to FIG. 4, distribution blocks 114 provide streams or feeds 40 of messages 10, 20 (coded data structures, e.g., see FIG. 3) to consumer computers 106, which decode the messages and make them available to client applications, or further distribute and/or store them. Consumer computers 106 are provided with one or more data models 200 (FIGS. 6 and 7) for decoding the messages. The data models represented by the exemplary definitions in FIGS. 5-15 contain the definitions and relationships used by a producer computer system to assemble events and messages and by a consumer computer system to decode events and messages.

As mentioned above, a (decoding) data model may be implemented by a run-time engine. In an embodiment of the invention, a data model is created as an object, e.g., in the C++ programming language, and receives data in coded data structures as instances of objects. In this embodiment, a data model defines a field catalog and a set of identifying data. In an embodiment of the invention, all data model objects are created and owned by the run-time engine for the life of a particular application process. Changes to a data model may be transmitted along with other data, e.g., as part of a data feed. A text version of a data model update (not shown) may contain updates such as new constants, new fields, deprecated fields, modified events, etc. Such updates may include adding, removing or modifying event or message definitions (identifying data definitions). An updated data model may then be available for use by the recipient computer system as coded data structures are received by the recipient computer system. However, an earlier version of the data model may be maintained by the recipient computer system to decode data structures that were created to be decoded according to the earlier version. According to this embodiment, it would not be necessary to restart a recipient computer process when an updated data model is provided. In an embodiment of the invention, data model objects are instantiated as singletons.

Marshaling and demarshaling a message is done with reference to the respective relevant definitions of the data model. The following describes how message bodies (i.e. exclusive of any headers or identifying information) are encoded in accordance with one embodiment of the invention, though other formats are possible, as described elsewhere. Each field included in an event type definition will be, in one embodiment, in either active or deprecated status or in active-private status, wherein values for fields of the latter type are not sent or stored as part of an encoded message.

Additionally, in another embodiment of the invention, fields may be encoded and decoded using information in addition to a field's externally visible type, e.g. strings may be tokenized in accordance with tables shared by the sender and receiver, or a particular encoding may be specified that is especially suitable to a field (e.g. in a market data application, specifying that milliseconds are to be left out of quote messages if it is known that quote timestamps will be provided only in whole seconds).

For each required field that is not active-private, the field value type is determined and the field's value is encoded for transmission (also referred to as "on the wire"), or storage in an appropriate format using the BinaryWriter interface (see FIG. 18) in accordance with the field's type and any encoding hints that are defined for the field. For example, 32-bit integers may be transmitted in network byte order. As another example, strings may be sent as a length followed by a sequence of characters, wherein the length may be encoded in a variable number of bytes depending on the actual value, so that short strings' lengths take only a single byte to encode. In financial market data and many other applications, the vast preponderance of strings is short. For example, the required fields for the event "MarketDepth.ByLevel.AskPrice" depicted in FIG. 5 are listed under "Required Fields" at the top of the page.

Each allowed optional field that is present in the message is encoded. An index counter starts at one for the first allowed optional field. If the "present" flag is set for this optional field, then the index counter is encoded to the wire, preferably using a variable-sized encoding so that small values take fewer bytes on the wire. The index counter can be used by the receiving side as a unique field identifier, in the context of the same event type definition. Then the field value is encoded, as described earlier. This process continues until all allowed optional fields have been checked. In one embodiment, a special index value of zero is written to indicate that there are no more optional fields.

A message is disassembled in accordance with reference to an event definition (message schema) and list of implicitly-included optional fields that was used during message assembly. These can be obtained based on an event id or an event+id.

In one embodiment, disassembly starts with a message object where all optional fields are initially absent. The event definition is consulted to obtain a list of required fields. These are iterated over in order; for each field, the field value is copied to field value storage associated with the message object, in accordance with the field's type. Next, the list of implicitly-included optional fields is iterated in a similar fashion. Finally, the explicitly-included optional fields are disassembled. Optional fields are parsed iteratively as follows. If data is still available in the message, an optional field id is read. If the optional field is equal to the "end marker", then the message is complete. Otherwise, a lookup table is consulted to find the corresponding field definition (in the president embodiment, this table is the "optional" data member, of type "Vector_FieldImpl", in EventTypeImpl, block 218, FIG. 18). The field definition includes the field's type, and the field's value is copied to field value storage associated with the message object, in accordance with the field's type. This process repeats until the message parsing is complete.

Alternatively, instead of copying field values from the encoded message, the field value storage associated with the message object can consist of pointers to the original encoded message, if the encoded message will remain in existence for the useful life of the message object.

The specific algorithms will depend on how messages are stored and how they are encoded for transmission or storage, and it is possible to implement multiple algorithms within a system, even with minimal change to the interfaces exposed to the client application. For example, it may be desirable to optimize the memory footprint for messages that are known to be relatively static and infrequently accessed.

A field message (or event) type has one of several status attributes, e.g., statuses including, but not limited to, active, active-private, deprecated or inactive. (Other statuses, such as active-hidden, are also possible). Active signifies that a data model object is in use and client applications should expect related field values to be populated. Active-private signifies that a data model object is accessible only to users with privileges to that object. Deprecated signifies that a data model object has been or will soon be discontinued and client applications should phase out use of the object. Inactive signifies that a data mode object has been deleted. Producer computer system 102 preferably will not provide client applications with messages that use inactive data model objects, but client applications will be able to use any messages received before the status change.

A data model may be viewed differently by developers of producer and consumer applications, and by a data modeler. A data modeler may view a feed of coded data structure objects as a collection of predefined fundamental types, e.g., compound and enumeration types, (typed) fields, assembled into messages or and events according to a data model. These objects are annotated with natural-language descriptions. A data model for decoding such a feed for use by a modeler may be stored as an XML document that is created and edited using a graphical editor. A supplemental (and optional) XML file may provide serialization frequencies for optimizing assignment of numeric identifiers. The XML document may include certain features that are not part of the run time data model (e.g., modeler's comments, field type definitions, links to database definitions or other database schema, etc.)

Developers of producer applications receive a binary "run-time" data model file and consult HTML documentation to understand the data model and look up textual names for fields and other objects. An example of a format for a data model in binary file format is depicted in FIG. 17. A producer application may create the binary file from XML documentation and transmit the run-time data model file to consumer applications at startup (and may update it subsequently).

Developers of consumer applications (e.g. feed adapter vendors) may use XML, HTML, .pdf or plain text human-readable documentation, which they consult when writing their code.

User interfaces may be constructed for creating data models for use in defining coded data structures, and data models for use in decoding coded data structures.

As mentioned above, the system 100 (FIG. 4) may decode the messages described herein using a data model loaded at run time in consumer computers 106 (FIG. 4). The data model (see exemplary definitions in FIGS. 5-15) functions as translation tables or data dictionaries at least for the required sections of messages (events), and preferably also for the optional section of messages. Data models may be installed in consumer computer systems 106 at start up and may include event definitions, object class relationships, message (event) types, field types (i.e., string, integer, float, etc.) and field sizes used to decode and process the data in each of the required and optional fields.

As mentioned above, data model updates are transmitted as part of the data feed and are available programmatically immediately. If an application is running when a data model is updated, the run-time engine will be able to continue to interpret both new and old model messages, and the application need not be restarted. Event handlers, discussed below, are registered by event type name and apply to messages of new and old versions of the event type.

A data model at a consumer computer system 106 (FIG. 4) may be updated periodically by the producer computer system 102, which provides the updates to distribution blocks 114 for transmission to consumer computer systems 106. This update feature allows data providers to easily and effectively modify the client side data model by changing identifying data and describing data definitions without requiring any recoding effort. As discussed above, data models, in an original or updated version, can remain active for the life of the application, which allows consumer computer systems to operate on new messages without restarting while continuing to operate on messages defined in earlier versions of data models. For example, a consumer computer systems service or subscription level may be upgraded or downgraded without restarting the system. A consumer computer system administrator may select changes, which can then be implemented simply by creating, or changing a data model and providing the data model to the requesting consumer computer system.

Providing data model changes as updates to a run time engine data model, as discussed above, avoids the need for consumer computer operators to provide programmers to implement such updates.

One benefit of installing data models at the client side for message decoding is that the identifying data for the required section and the describing data for the optional fields can be made relatively small (e.g., one byte). Another benefit is the number of sections of identifying data needed to describe data in a message may be minimized, because one such section may be used to indicate the information contained multiple data fields. These techniques may significantly reduce the bandwidth required to transmit messages across from producer computer system 102 (FIG. 4) to consumer computer systems 106, and thus increase transmission speed. As mentioned above, providing implied default values in messages if no specific data is present in an optional or required field further reduces message size.

Application event handlers (callbacks) that process market data or administrative notifications use the data model API to process self-describing messages. Event handlers are registered by event type name. An event handler can be registered for more than one event type. Wildcards may be permitted: e.g., a completely generic event handler can register to receive event types whose names match "*". An example of such an event handler would be one that performs generic processing by iterating over field values present in each message.

The number and functionality of the application's event handlers should be determined based on the structure of the application and on which events convey the information the application requires. For example, if a simple program trading application maintains a cache of real-time U.S. equities data and updates its valuation models based on trades, it might register an event handler for Quote.Ask.Price, Quote.Bid.Price, Trade.Price, and Summary (for pre-open, close and intraday cache refreshes and updates) events to update the application's cache; and an event handler for Trade.Price events to update the application's valuation models.

Additionally, the application may need to register event handlers for administrative notifications. Event registration introduces an application dependency on names of data model event types. Although fields may be added or removed from an event type, the event type names themselves are unlikely to change. It is thus reasonable to code these as constants in application codes.

Event handlers retrieve field values from messages and perform application processing. To retrieve field values using the data model API, the application needs to provide appropriate storage for the field's type. This means that the application either needs to know the types of the fields it processes or needs to be able to process all field value types in a generic fashion. For efficiency, values may be retrieved using a field handle (FieldRef pointer). It is also possible to iterate over the handlers of fields present in a message. Event handlers can filter messages based on the field MD.Security.ID.Bloomberg using an application list of securities of interest. This list could be constructed based on information received in Reference.Security.Equity messages (for which an appropriate event handler would need to be registered).

FIGS. 18a-18l represent one possible hierarchical arrangement of interface, class and associated object and type definitions in accordance with an OOP embodiment of the invention. These definitions are represented in FIG. 18 by blocks with designations such as "FieldImpl" and "BinaryWriter." As shown in FIG. 16, date_t block 201 may represent a definition of a programming language type or object suitable for representing a date. BinaryWriter block 202 may be an interface implemented by a client of the run-time engine that may perform marshaling (e.g., calling write( ) methods to encode on wire or store) of certain information such as event type ids, SDMessages or content models.

BinaryReader block 203 may be an interface implemented by a client of the run-time engine that may demarshal (e.g., calling read( ) methods to decode from the wire or store) certain information such as event type identifiers, SDMessages, or content models. Enumeration block 204 may be an interface for a content model field type that may represent one of a collection of named constants, wherein the set of constants may be dynamic (e.g., loaded/updated as part of a content model, or initialized programmatically using addConstant( )). The Enumeration interface 208 may include methods for inspecting the enumeration definition, i.e., programmatically accessing its name, description, status and set of constants. In some embodiments, the name may be a string and the constants may be numeric values, but other ways of identifying are possible.

EnumerationImpl block 205 may be an implementation class for Enumeration. Constant block 206 may be an interface for a content model element that represents a possible value for an Enumeration. ConstantImpl block 207 may be an implementation class for Constant. Constant_iterator block 208 may represent a definition of a programming language type or object suitable for iterating through the set of constants defined for an Enumeration.

Status block 209 may be a definition of a programming language type or object suitable for indicating the validity of a content model object. In some embodiments, content model objects may be individually versioned. BitArray block 211 may be an interface for defining a set of bit masks to use in interpreting an integer field value such as a set of Boolean flags that are named. BitArrayImpl block 212 is a class that implements BitArray 211. Field block 213 may be an interface for a content model class that defines a named, portion of data that may give meaning to certain values. FieldImpl block 214 is a class that implements Field. Type block 215 may be a definition of a programming language type or object suitable for indicating the type of a field in the content model. EventType block 216 may be an interface for a content model class that defines a named, data model supporting collections of fields that are required or optional. Iterator block 217 may represents a definition of a programming language type or object suitable for iterating through the set of fields allowed within an EventType, or through content model elements in the context of DataDictionary block 220. EventTypeImpl block 218 may be a class that implements EventType 216. Block 218 may be used whenever marshaling/demarshaling messages of the given event type.

FieldInclusion block 219 may be a definition of a programming language type or object suitable for indicating the criteria that determine the circumstances under which a value shall be present in a message of a given event type. In some embodiments, however, block 219 may support more complicated criteria, e.g. conditional depending on other fields' inclusion. DataDictionary block 220 may be an interface for loading or demarshaling one or more content models, accessing the content model(s), and demarshaling or storing the content model. Block 220 may be accessed by looking by name of content model elements as well as iteration through the content model elements.

DataDictionaryImpl block 221 may be a class that implements DataDictionary block 220. SDMessage block 222 may be an interface for a message containing description or identifying data. Field_iterator block 223 may represent a definition of a programming language type or object suitable for iterating through the set of fields present within an SDMessage from block 222. SDMessageImpl block 224 may be a class that implements SDMessage block 222. SDMessageImpl.Fields block 226 may hold values for a message's fields, wherein the values are stored in an array with another array indicating whether each value is populated (e.g., present in the message). This block may optimize performance for certain usage criteria. FieldValue block 225 may hold a value for a single field of any type.

Moreover, embodiments of the present invention may include techniques for handling conflicts that may occur when multiple data models are operating with multiple data providers. For example, in an embodiment where there is only one data provider using a single data model, there will be no conflicts among multiple data model definitions as there is likely only one data model in operation. In such a single-data model configuration, a producer (sending) application, or an intermediate data forwarding node, can provide the data model to receivers (e.g., receiving or disassembling computer systems) or by simply sending a byte-by-byte copy of the binary data model file loaded by the producer during initialization. Alternatively, the encoded data model can advantageously be constructed "on the fly" from the definitions that exist within a sending application instance, i.e., in the above embodiments, the sending application instance's set of interrelated EnumerationImpl, ConstantImpl, FieldImpl and EventTypeImpl objects. The in-memory definitions can be iterated and encoded per the data model definition formats in FIGS. 5-15 in a manner known to those skilled in the art.

The "on the fly" mode of transmitting data models allows for data model definitions to be created programmatically at run-time, e.g., creating a set of constants for an enumeration based on loading the contents of an external database, as is provided for in the above embodiment using the Enumeration::addConstant method. In a financial market data application, a set of constants to indicate, e.g., market data sources, could be created from a table of pricing contributors.

In either case, the receiver will either store it to a file and then load the file, or parse it straight "off the wire" in the same fashion as if it were being loaded from a file. In an OOP embodiment of the invention, this process will instantiate all of the various object instances associated with the data model, e.g. for each field defined in the data model, a FieldImpl object will be created. The receiver can and should avoid creating duplicate objects if the same definition is received multiple times (e.g. if the producer restarts several times during the life of the receiving application process). The receiver can apply various tests to determine whether or not existing and new definitions are identical. For example, two field definitions can be considered identical if the field name and field type are identical (i.e. the status and textual descriptions may differ). Two event definitions can be considered identical if the event id, event name and the lists of required and optional fields are all identical. Two enumerations can be considered identical if the enumeration names are identical, and two enumeration constants for a given enumeration can be considered identical if the constants' numeric ids and names are identical.

However, in some real-world deployment environments, a data receiver may be receiving data models and messages from multiple sending locations. For various operational reasons, some data providers may be using different versions of a common data model, e.g., if a data model is updated at a certain point in time, and data providers restart at different times (where they load the latest data model upon restart), as may happen in a financial market application when there are different senders for European, Asian and American markets.

In such a configuration, where multiple data models or versions of a data model are in simultaneous use, each producer (sending) application can provide its corresponding data model to receivers as described above. The receiver will create new definition objects only for new definitions. The receiver will then have the "union" of all the senders' definitions represent in its collection of data model definition objects. In a configuration where a receiver aggregates data from multiple senders, the receiver can use the "on the fly" mode of generating and transmitting data model definitions to send receivers an aggregated data model definition, even though such a file may never have existed as such.

In multiple data configurations, data model versions should not conflict in the sense that a received data message should be able to be parsed unambiguously (i.e., any identifying information should uniquely identify the event type and sequence of the required and optional fields (and their types)). An example of a conflict would be if one sender were using a given numeric identifier to signify a "Trade.Price" message while another one used the same numeric identifier to signify a "Summary" message. Such identifiers are found in a data model transmitted to client sites and, in a typical deployment, may precede each message. Similarly, identifiers for enumeration constants must be unambiguously parsable, e.g., in a financial market data application a numeric id of 6 for a "QuoteType" enumeration cannot indicate "BEST" quote in the context of one active producer while indicating an "AWAY" quote in the context of another active producer.

Potential conflicts may be handled in several ways. One way may include examining other data models for potential conflicts prior to assigning identifiers for inclusion in a new data model version. In some embodiments, where there is no conflict, (e.g., an event type or constant definition remains identical between data model versions), the numeric identifier may be reused. Otherwise, a new identifier is chosen, e.g., by selecting the next unused numeric identifier in sequence.

Moreover, after messages using one or more identifiers have been demarshaled, the numeric identifiers may be reused for something incompatible with the prior use. Such reuse may tend to keep the numeric values smaller, allowing for a more compact representation during transmission. In one embodiment of the invention, the assignment can be done automatically.

Conflicts can also be detected when content models are loaded. If an event id or event+ id is present in only one data model, no conflict exists. If, however, the event id or event+ id is present in both models and indicates a different type of message (e.g., "Trade.Price" vs. "Summary"), there is a conflict. Alternatively, a conflict also exists if the event id or event+ id is present in both models and: (a) indicates a different sequence of required fields; (b) indicates a different set of implied optional fields; or (c) indicates a different sequence of optional fields. Moreover, a conflict exists if two event+ ids indicate differing additional information about any of the fields' values, e.g., an implicit length or value. Otherwise, there is no conflict.

Once detected, conflicts can be reported in a textual error string, (e.g., as may be done by DataDictionaryImpl::error( ) in FIG. 16). Although the receiver may ignore messages depending on the ambiguous identifiers, it may keep the ambiguous definitions in a "watch" list or "zombie" list, so if required to further transmit content model(s) that it has loaded and/or received to further downstream receivers, the downstream receivers will also be aware of the conflicts (and will put the definitions in its own watch list and know to ignore potentially ambiguous messages).

The format used to distribute data model definitions may provide for reuse of event ids and deletion of zombie events, e.g. as may be communicated by sending an event definition in an "inactive" status, as defined in block 209 in FIG. 18.

Additionally, some embodiments of the invention employ certain error checking routines such as a hash made on an event type definition (e.g., all information that must agree for two definitions to not conflict) as an additional conflict check. This can be used by preceding each encoded message with the cyclic redundancy check (e.g., CRC 16 hash) of the event type from the data provider. Prior to parsing each received message, the receiver may verify that the received CRC 16 agrees with that reported by the event type that will be used to parse the message. An error can be reported if there is a mismatch.

It will be appreciated that the invention has utility in the field of data storage, and in applications other than financial services. Coded data structures, constructed in accordance with embodiments of the invention may be created by users in order to conserve space in storage mediums when storing large amounts of data. For example, a user may archive or otherwise store data by assembling the coded data structures described herein and placing them in a storage medium. Subsequently, the coded dated structures may be retrieved and decoded to reconstitute the information for subsequent use. Such embodiments should be recognized as within the scope of the present invention.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

The invention claimed is:

1. A method of electronically providing financial data to one or more recipients, the method being performed by a computer system that comprises at least one processor, at least one memory operatively coupled to at least one of the processors, and at least one network interface operatively coupled to at least one of the processors, and the method comprising:
   receiving through at least one of the network interfaces data that comprises a plurality of values;
   in response to receiving the data, automatically selecting, from a data dictionary stored in the memory, a type of message for use in transmitting the data, the selected type of message including a plurality of fields that includes at least one required field and at least one implicitly-included optional field;
   assembling in the memory a data structure that represents the message, the data structure comprising an event+ id and the plurality of fields,
   each field comprising one of the values, and
   the event+ id being represented as a single number that comprises (a) an event id that identifies the type of message, such that the type of message includes the at least one required field, and (b) additional identifying data that identifies the at least one implicitly-included optional field; and
   transmitting the data structure through the network interface in a data stream.

2. The method of claim 1, wherein the data structure comprises at least one explicitly-included optional field, each explicitly-included optional field comprising (a) one of the values and (b) respective identifying data, limited to that additional field, that identifies the respective one of the values.

3. The method of claim 2, wherein automatically selecting the message type comprises automatically identifying a type of message within the data dictionary such that a data structure that comprises fields corresponding to each of the plurality of values has the fewest explicitly-included optional fields of any such data structure that may be assembled in connection with the data dictionary.

4. The method of claim 1, wherein assembling the data structure comprises:
   automatically determining that one of the values is equal to a default value associated with the message type and that the value corresponds to a required field for that message type; and
   omitting the value for the corresponding required field from the data structure.

5. The method of claim 1, wherein assembling the data structure comprises:
   automatically determining that one of the values is equal to a default value associated with the message type and that the value corresponds to an implicitly-included optional field for that message type; and
   omitting the implicitly-included optional field from the data structure.

6. The method of claim 1, wherein the meaning of the additional identifying data depends on the event id.

7. The method of claim 1, wherein automatically selecting the message type uses an algorithm such that the message type selected for any specified plurality of values may vary depending upon the order in which the values are received.

8. A computer system for electronically providing financial data to one or more recipients, the computer system comprising:
   at least one processor;
   at least one memory operatively coupled to at least one of the processors;
   at least one network interface operatively coupled to at least one of the processors; and
   a computer-readable storage medium operatively coupled to at least one of the processors and encoded with instructions that, when executed by at least one of the processors, cause the computer system at least to
   receive through at least one of the network interfaces data that comprises a plurality of values;
   in response to receiving the data, automatically select, from a data dictionary stored in the memory, a type of message for use in transmitting the data, the selected type of message including(a plurality of fields that includes at least one required field and at least one implicitly-included optional field;
   assemble in the memory a data structure that represents the message, the data structure comprising an event+ id and the plurality of fields, each field comprising one of the values, and the event+ id being represented as a single number that comprises (a) an event id that identifies the type of message, such that the type of message includes the at least one required field, and (b) additional identifying data that identifies the at least one implicitly-included optional field; and
   transmit the data structure through the network interface in a data stream.

9. The computer system of claim 8, wherein the data structure comprises at least one explicitly-included optional field, each explicitly-included optional field comprising (a) one of the values and (b) respective identifying data, limited to that additional field, that identifies the respective one of the values.

10. The computer system of claim 9, wherein automatically selecting the message type comprises automatically identifying a type of message within the data dictionary such that a data structure that comprises fields corresponding to each of the plurality of values has the fewest explicitly-included optional fields of any such data structure that may be assembled in connection with the data dictionary.

11. The computer system of claim 8, wherein assembling the data structure comprises:

automatically determining that one of the values is equal to a default value associated with the message type and that the value corresponds to a required field for that message type; and omitting the value for the corresponding required field from the data structure.

12. The computer system of claim 8, wherein assembling the data structure comprises:

automatically determining that one of the values is equal to a default value associated with the message type and that the value corresponds to an implicitly-included optional field for that message type; and omitting the implicitly-included optional field from the data structure.

13. The computer system of claim 8, wherein the meaning of the additional identifying data depends on the event id.

14. The computer system of claim 8, wherein automatically selecting the message type uses an algorithm such that the message type selected for any specified plurality of values may vary depending upon the order in which the values are received.

15. A computer-readable storage medium encoded with instructions that, when executed by at least one processor within a computer system that comprises at least one memory operatively coupled to at least one of the processors and at least one network interface operatively coupled to at least one of the processors, cause the computer system to carry out a method that comprises:

receiving through at least one of the network interfaces data that comprises a plurality of values;

in response to receiving the data, automatically selecting, from a data dictionary stored in the memory, a type of message for use in transmitting the data, the selected type of message including a plurality of fields that includes at least one required field and at least one implicitly-included optional field;

assembling in the memory a data structure that represents the message, the data structure comprising an event+ id and the plurality of fields, each field comprising one of the values, and the event+ id being represented as a single number that comprises (a) an event id that identifies the type of message, such that the type of message includes the at least one required field, and (b) additional identifying data that identifies the at least one implicitly-included optional field; and transmitting the data structure through the network interface in a data stream.

16. The computer-readable storage medium of claim 15, wherein the data structure comprises at least one explicitly-included optional field, each explicitly-included optional field comprising (a) one of the values and (b) respective identifying data, limited to that additional field, that identifies the respective one of the values.

17. The computer-readable storage medium of claim 16, wherein automatically selecting the message type comprises automatically identifying a type of message within the data dictionary such that a data structure that comprises fields corresponding to each of the plurality of values has the fewest explicitly-included optional fields of any such data structure that may be assembled in connection with the data dictionary.

18. The computer-readable storage medium of claim 15, wherein assembling the data structure comprises:

automatically determining that one of the values is equal to a default value associated with the message type and that the value corresponds to a required field for that message type; and omitting the value for the corresponding required field from the data structure.

19. The computer-readable storage medium of claim 15, wherein assembling the data structure comprises:

automatically determining that one of the values is equal to a default value associated with the message type and that the value corresponds to an implicitly-included optional field for that message type; and omitting the implicitly-included optional field from the data structure.

20. computer-readable storage medium of claim 15, wherein the meaning of the additional identifying data depends on the event id.

21. The computer-readable storage medium of claim 15, wherein automatically selecting the message type uses an algorithm such that the message type selected for any specified plurality of values may vary depending upon the order in which the values are received.

* * * * *